United States Patent [19]

Beyers, II et al.

[11] Patent Number: 5,155,590
[45] Date of Patent: Oct. 13, 1992

[54] SYSTEM FOR DATA CHANNEL LEVEL CONTROL

[75] Inventors: Robert J. Beyers, II, Snellville; Charles R. Bramhall, Norcross; Gregory S. Durden, Jonesboro; Robert J. Edwards, Lawrenceville; Ray T. Haman, Jr., Duluth; Douglas J. Hoder, Lakewood; Donald R. Huntley, Roswell; John A. Kennedy, Doraville; Emory L. McGinty, Jr., Lilburn; Jay C. McMullan, Jr., Doraville; David J. Naddor, Doraville; Randolph J. Schaubs, Stone Mountain; Jesse M. Still, Woodstock; Anthony J. Wasilewski, Alpharetta; Lamar E. West, Jr., Maysville; Donovan S. White, Alpharetta, all of Ga.

[73] Assignee: Scientific-Atlanta, Inc., Norcross, Ga.

[21] Appl. No.: 498,084

[22] Filed: Mar. 20, 1990

[51] Int. Cl.$^5$ .................. H04B 17/00; H04H 1/02
[52] U.S. Cl. .................. 358/86; 455/71; 455/5.1; 455/6.1; 455/67.1
[58] Field of Search ............... 455/3, 4, 5, 6, 67, 455/69, 62, 71, 88, 68, 63, 70, 115; 358/84, 86; 310/825.07, 825.54

[56] References Cited

U.S. PATENT DOCUMENTS

| | | | |
|---|---|---|---|
| 3,704,419 | 11/1972 | Rheinfelder | 325/308 |
| 3,750,022 | 7/1973 | Curry et al. | 455/6 |
| 3,924,187 | 12/1975 | Dormans | 455/5 |
| 4,509,073 | 4/1985 | Baran et al. | 358/86 |
| 4,512,033 | 4/1985 | Schrock | 455/2 |
| 4,520,508 | 5/1985 | Reichert | 455/4 |
| 4,528,663 | 7/1985 | Citta | 370/94 |
| 4,554,579 | 11/1985 | Citta | 358/86 |
| 4,633,462 | 12/1986 | Stifle et al. | 370/85 |
| 4,648,123 | 3/1987 | Schrock | 455/67 |
| 4,653,114 | 3/1987 | Berman | 455/5 |
| 4,752,954 | 6/1988 | Masuko | 380/20 |
| 4,868,795 | 9/1989 | McDavid | 455/69 |
| 4,910,791 | 3/1990 | Dickinson et al. | 455/4 |
| 4,930,120 | 5/1990 | Baxter et al. | 370/73 |
| 4,931,988 | 6/1990 | Takahashi | 364/900 |
| 4,935,924 | 6/1990 | Baxter | 370/73 |

FOREIGN PATENT DOCUMENTS 62-141829  6/1987  Japan .

Primary Examiner—Reinhard J. Eisenzopf
Assistant Examiner—Chi H. Pham
Attorney, Agent, or Firm—William A. Marvin

[57] ABSTRACT

Automatic level calibration apparatus for transmitting data from a cable television terminal to the headend of a cable television system comprises programmable transmitter apparatus of the terminal, programmable receiving apparatus at the headend and a calibration controller. Responsive to an addressed command from the headend, the programmable transmitter apparatus returns a sequence of levels at a particular calibration frequency. The programmable receiver apparatus determines an indication of the received signal strength of each of the levels of the sequence of levels. The controller determines an optimum level for transmissions from the terminal.

20 Claims, 16 Drawing Sheets

SYSTEM FOR DATA CHANNEL LEVEL CONTROL

CROSS REFERENCE TO RELATED APPLICATION

This application is related by subject matter to concurrently filed Application Ser. No. 07/498,083 entitled Cable Television Radio Frequency Subscriber Data Transmission Apparatus and RF Return Method.

BACKGROUND OF THE INVENTION

1. Technical Field

This invention relates to cable television systems and, more particularly, to apparatus for transmitting data over a cable television channel susceptible to interference noise, the data being transmitted over a plurality of selectable data channels having carrier frequencies which are not harmonically related and are located within a television bandwidth channel reserved for upstream transmission from a CATV subscriber to a headend control location. In accordance with the calibration method of the present invention, the upstream transmit levels are automatically set on a periodic basis.

2. Description of the Prior Art

The development of cable television systems has reached the stage where not only is the provision of two way information flow desirable but is practically required by the implementation of new services. For example, in the implementation of impulse pay-per-view service where the subscriber may impulsively select an event for viewing and assume a charge, at least one data channel such as a telephone communication channel or an RF channel is required in an upstream (reverse) direction from a cable television subscriber to a cable television headend to report service usage data. Other uses for a return path include power meter reading, alarm services, subscriber polling and voting, collecting subscriber viewing statistics, and home shopping. While not every cable television system operator provides for two way transmission, manufacturers of cable television equipment have tended to provide for upstream transmission in the direction from the subscriber toward the headend. Practically all such manufacturers provide so-called split or two way systems having a spectrum of frequencies for upstream transmission which at least includes a band from 5 to 30 megahertz. This band of interest comprises cable television channel T7 (5.75-11.75 megahertz), T8 (11.75-17.75 megahertz), T9 (17.75-23.75 megahertz) and T10 (23.75-29.75 megahertz). These return path channels, each having television signal bandwidth, may be used, for example, for video conferencing. Whether a so-called "sub-split", "mid-split" or "high-split" system is applied for two way transmission by a headend operator, all three types of split transmission systems typically involve an upstream transmission in the 5-30 megahertz band of interest.

An article entitled "Two-Way Cable Plant Characteristics" by Richard Citta and Dennis Mutzbaugh published in the 1984 National Cable Television Association conference papers demonstrates the results of an examination of typical cable television (CATV) return plants. Five major characteristics in the 5-30 megahertz upstream band were analyzed. These include white noise and the funneling effect; ingress or unwanted external signals; common mode distortion resulting from defective distribution apparatus; impulse noise from power line interference and other influences; and amplifier non-linearities.

White noise and Gaussian noise are terms often used to describe random noise characteristics. White noise describes a uniform distribution of noise power versus frequency, i.e., a constant power spectral density in the band of interest, here, 5-30 megahertz. Components of random noise include thermal noise related to temperature, shot noise created by active devices, and 1/f or low frequency noise which decreases with increased frequency. The term noise floor is used to describe the constant power level of such white noise across the band of interest.

This noise is carried through each return distribution amplifier which adds its own noise and is bridged to the noise from all branches to a line to the headend. This addition of noise from each branch of a distribution tree in a direction toward a headend is known as noise funneling or the funneling effect. The constant noise floor power level defines a noise level which a data carrier power level should exceed.

The present invention is especially concerned with interference noise which causes peaks in the noise spectral density distribution in the band of interest. Interference noise destroys effective data transmission when known data transmission coding techniques such as frequency or phase shift keying are practiced over a single data transmission channel. In particular, interference noise especially relates to the four characteristics of return plant introduced above: ingress, common mode distortion, impulse noise and amplifier non-linearities.

Ingress is unwanted intended external signals entering the cable plant at weak points in the cable such as shield discontinuities, improper grounding and bonding of cable sheaths, and faulty connectors. At these weak points, radio frequency carriers may enter caused by broadcasts in, for example, the local AM band, citizen's band, ham operator band, or local or international shortwave band. Consequently, interference noise peaks at particular carrier frequencies may be seen in noise spectral density measurements taken on cable distribution plant susceptible to ingress.

Common mode distortion is the result of non-linearities in the cable plant caused by connector corrosion creating point contact diodes. The effect of these diodes in the return plant is that difference products of driving signals consistently appear as noise power peaks at multiples of 6 megahertz, i.e., 6, 12, 18, 24 and 30 megahertz in the band of interest.

Impulse noise is defined as noise consisting of impulses of high power level and short duration. Corona and gap impulse noise are created by power line discharge. Temperature and humidity are especially influential in determining the degree of corona noise, while gap noise is a direct result of a power system fault, for example, a bad or cracked insulator. The resultant impulse noise spectrum can extend into the tens of megahertz with a sin x/x distribution.

Amplifier nonlinearities or oscillations relate to pulse regenerative oscillations caused by marginally stable or improperly terminated amplifiers. The result is a comb of frequency peaks within the return plant band whose spacing is related to the distance between the mistermination and the amplifier.

From examining typical cable distribution plants, Citta et al. concluded that "holes" exist in valleys between peaks in the noise spectrum they plotted between 0 and 30 megahertz. They proposed that these valleys may be used to advantage by carefully choosing return carriers "slotted" in these valleys.

In follow-up articles published at the 1987 National Cable Television Conference and in U.S. Pat. No. 4,586,078, Citta et al. conclude that a 45 kilobit data signal may be alternately transmitted by a coherent phase shift keying (CPSK) technique over carriers at 5.5 megahertz and 11.0 megahertz or in the vicinity of the T7 and T8 cable television channels respectively. A switch at the subscriber terminal alternately selects the 5.5 MHz carrier or the harmonically related 11 MHz carrier for transmission. This form of alternating carrier transmission of messages is continued until the data is successfully received. In other words, alternating transmission on the two carriers occurs until an acknowledgment signal indicating successful receipt of a message is received at a terminal. While the choice of these carrier frequencies is claimed to avoid the noise distribution peaks caused by interference noise, there is considerable concern that such a modulated phase shift keyed data stream will run into noise peaks in cable television distribution network outside of the investigations of Citta et al. Referring to FIG. 2 republished here from U.S. allowed application Ser. No. 07/188,478 filed Apr. 29, 1988, transmission at 5.5 MHz should be practically impossible. Noise peaks have been known to appear and disappear based on time-of-day, season, and other considerations.

Other return path or upstream data transmission schemes have been tried. These schemes include, for example, the telephone system, described as "ubiquitous" by Citta et al. In other words, the return data path to a cable television headend is not provided over the cable television distribution plant at all. The serving cable is intentionally avoided either because of the interference noise problem in a split system or because the system is a one way downstream system. Instead, the subscriber's telephone line is used for data transmission. In this instance, however, there is concern that local telephone data tariffs may require the payment of the line conditioning surcharges if the telephone line to a subscriber's home is used for data transmission in addition to normal "plain old" telephone service. Furthermore, the telephone line is only available when the subscriber is not using it, requiring an unscheduled or periodic data flow.

Another known return data transmission scheme involves the application of a separate data channel at a carrier frequency that avoids the troublesome 5-30 megahertz band. This scheme, of avoiding the noisy 5-30 megahertz band, is only possible in midsplit and high split systems.

So-called spread spectrum transmission of data is a technology which evolved for military requirements from the need to communicate with underwater submarines in a secure manner. Spread spectrum derives its name from spreading a data signal having a comparatively narrow bandwidth over a much larger spectrum than would be normally required for transmitting the narrow band data signal.

More recently the security advantages provided by spread spectrum transmission have been disregarded in favor of its capability of application in an environment of interference. For example, communications systems operating over a power line where impulse noise levels due to the power line are high have been attempted in the past but found to be only marginally acceptable, for example, power line plug-in intercom systems commercially available from Tandy Radio Shack. The Japanese N.E.C. Home Electronics Group, however, has demonstrated a spread spectrum home bus operating at 9600 baud over an AC line in a home that is practical up to distances of 200 meters of power line. The NEC system has been characterized as the missing link between a coaxial cable (for example, a cable television cable) and an AC power line common to the majority of homes.

U.S. Pat. No. 4,635,274 to Kabota et al. describes a bidirectional digital signal communication system in which spread spectrum transmission is applied for upstream data transmission in a cable television system. Such technology is very expensive, however, when compared with telephone data return.

Consequently, despite the development of spread spectrum and other RF data return, the requirement remains in the cable television art for an upstream data transmission having high data throughput from a plurality of subscriber premises to a cable television headend utilizing the cable television distribution plant and which is relatively impervious to interference noise.

The concept of Impulse Pay Per View (IPPV) is well understood in the art, but is described briefly here for completeness. Essentially it is a sales method by which a pay (cable) television subscriber may purchase specific program events on an individual basis. Furthermore, the purchase may be contracted on an "impulse" basis solely by interacting with the subscriber's in-home set-top terminal (STT). Although it is not a requirement that the event being purchased be "in progress", it is a requirement that the system support the purchase of events that are in progress. The purchase must be handled in a manner that does not incur any appreciable delay in the subscriber's ability to view the event immediately (i.e. instant gratification).

Although several techniques of implementing the above sales method exist, all techniques have common requirements. Some part of the system must make a decision whether or not to allow the purchase and subsequent viewing of the event. If allowed, the purchase of the specific event must be recorded and reported to what is typically known as the "billing system" so that the program vendor eventually receives revenue from the transaction.

To accomplish purchased event reporting, a so-called "store and forward" technique is used. In the store and forward method, the set-top terminal assumes that if the subscriber is pre-enabled for IPPV capability, then an event purchase is allowed. When the subscriber performs the necessary steps to purchase an event, the set-top terminal allows the event to be viewed (typically by de-scrambling a video signal on a particular channel) and records the purchase of the event. The record is typically stored in a secure, nonvolatile memory, as it represents revenue to the program vendor.

Obviously, in order to realize the revenue, the vendor's billing system must obtain the purchase record data stored in all of the subscribers' set-top terminals in a timely manner. To accomplish this, the system control computer (hereafter called the system manager) periodically requests that the set-top terminals return the IPPV purchase data stored in memory. When the system manager receives the data from a set-top terminal, it typically then acknowledges the receipt to the terminal (i.e., as does Citta et al.) and the data is cleared from memory to make room for additional purchase data. The system manager then forwards this data to the billing system, and the IPPV purchase cycle is completed.

While IPPV return data considerations are important to the determination of an RF data return technique, such IPPV return data considerations are not the only consideration, but admittedly are the most critical because of the high data throughput requirements. Other requirements such as using the return data path for subscriber polling, burglar alarm, meter reading, home shopping, energy management and the like are additive to the data throughput requirements of IPPV service.

Consequently, there remains a requirement in the art for RF data return apparatus having high data throughput to the degree of supporting a full range of services including IPPV service.

SUMMARY OF THE INVENTION

The present invention relates to radio frequency data return apparatus for the periodic and prompt recovery of set-top terminal purchase record and other information via reverse cable RF communication. The present invention is primarily related to modifications to so-called system manager apparatus at a headend for receiving data returned over an RF data return path, a frequency diverse RF receiver apparatus for receiving data modulated and transmitted over a plurality of data channels from all the subscriber terminals or modules of a system, and the subscriber terminal or module itself.

It is one object of the present invention that implementing RF subscriber data return not require any significant changes to the billing system. Furthermore, the RF subscriber data return process should operate independently of telephone line return; i.e., they should operate side by side. Also, RF subscriber data return apparatus should be compatible with any headend or terminal apparatus used for forward or downstream transmission. A familiarity with the system apparatus and terms may be obtained from the following overview:

SYSTEM MANAGER

This is the primary control computer for the cable television system. The system manager accepts input commands from both human operators and the billing computer. It generates appropriate control transactions that are sent over the forward (downstream) cable path to the set-top terminals via a control transmitter. It accepts return data from a frequency diverse data receiver and processor (also called herein the RF-IPPV processor) and forwards the return data to the billing computer.

CONTROL TRANSMITTERS

These are devices for converting standard RS-232 serial data from the system manager to a modulated RF signal for transmission over the cable to a set-top terminal or IPPV module. In a known cable system available from the assignees of the present invention, the control transmitter may be an Addressable Transmitter (ATX) or a Headend Controller and Scrambler, or a combination of both. For the purposes of the present invention, the control transmitter is primarily a pass-through device and is described for completeness.

BIDIRECTIONAL AMPLIFIER

These trunk distribution amplifiers and line extenders amplify and pass a certain portion of the RF spectrum in the forward (downstream) direction and a different portion of the RF spectrum in the reverse direction. This makes bidirectional communication possible over a single coaxial cable. The bidirectional amplifiers are also passthrough devices and are described only for completeness.

SET TOP TERMINAL

These devices are the interface between the cable system and a subscriber and his/her television set. Among other functions, the set-top terminals perform tuning, frequency down conversion, and de-scrambling of the cable video signals on a selective basis. They accept both global and addressed control transactions (i.e. transactions directed to either all or individual terminals) from the control transmitter to configure and control the services they deliver. In addition, the set-top terminal may be equipped with an internal radio frequency return module or be provided with an interface to an adjunct external data return module so that a secure memory device of either the terminal or the external module may be provided for storing purchased event or other data to be returned. Furthermore, either the set-top terminal or an associated module includes a frequency diverse reverse path data transmitter in accordance with the present invention. Such a set-top terminal either equipped or associated with an RF-IPPV module will be referred to herein as an RF-STT.

RF IPPV MODULE

The RF IPPV module is a module associated with the set-top terminal if the set top terminal is not provided with an internal frequency diverse reverse path RF data transmitter.

RF IPPV PROCESSOR

The RF IPPV processor is primarily a frequency diverse RF data receiver for the reverse path data transmitters of the terminals or modules. It simultaneously recovers data from modulated RF signals on up to four (or more) distinct reverse data channels. It then filters out redundant data messages, assembles the data into packets, and forwards the packets to the system manager on a standard RS-232 data link. A minimum of one processor is required for each cable television system headened.

It is an overall object of the present invention that the radio frequency subscriber data return apparatus must be easy to use, work reliably and have high data throughput, integrity and security. In addition, the present invention is designed to meet three specific performance goals:

1. The RF data transmission apparatus must be extremely tolerant of relatively high levels of discrete interference sources typical in reverse channels of cable distribution plants. The interference is due to ingress of external RF sources into the cable plant, all of which are "funneled" to the data receiver.

2. The data return method must be fast enough so that an operator can obtain data from all set-top terminals, in even a large, two hundred thousand terminal per headend cable television system, every 24 hours or less.

3. Any frequency or level adjustment of the individual set-top terminals or associated modules required at installation in a subscriber location must be virtually automatic.

The first two objectives correspond to two major functional aspects of the present invention, the frequency reverse path communication technique and a media access/data return protocol according to the present invention. The third objective is related to the performance of the communication technology and is primarily related to promoting automatic maintenance of the system despite changing environmental conditions. Copending concurrently filed application Ser. No. 67/458,083 is concerned with the first two objectives.

The present invention is primarily concerned with the third objective and, in particular, to a method of periodically calibrating set-top terminal or IPPV module RF data transmit levels to compensate for changing environmental conditions. Besides environmental considerations, cable distribution plant relocation or reconfiguration can bring about a need for recalibration of the terminals of a system. A calibration loop is formed comprising the system manager, the terminal of IPPV module and the frequency diverse RF return data receiver, the system manager having overall control of the calibration operation. For the purposes of the present invention and according to the following detailed description of the invention, the system manager comprises a calibration controller algorithm for controlling the calibration loop components and operation including subordinate control algorithms of the RF IPPV processor and the set top terminal/module.

In response to an addressable command initiated by the calibration controller, a particular set-top terminal or module selects a calibration channel frequency, for example, channel D of four selectable data channels for transmission. Also, a first transmit level of, for example, a sequence of eight levels is predetermined at the subscriber terminal/module transmitter. Upon receipt of the signal, its level is determined at the RF-IPPV data receiver which compares the signal level with an expected level. Since the strength of the signal will likely be at too high or too low a level, the terminal continues to adjust its transmit level through the predetermined sequence of levels for the calibration channel. The sequence of levels are transmitted in periodic messages having predetermined duration. All the signals that are received are tabulated, the results compared with expected levels, and a particular in-range optimum transit level determined by the RF-IPPV processor. The RF-IPPV processor may interpolate between two in-range levels as required. Also, since timing between messages is known and the sequence of levels is transmitted in messages of predetermined length, the message sequence timing may be checked for accuracy. According to an addressable command, the module transmitter is then set to transmit at least one message at the determined optimum level. All other data return channel transmit levels for channels A, B and C are then adjusted in accordance with the level of the calibration channel level at the IPPV set-top terminal or associated RF-IPPV module. A predetermined slope or tilt characteristic for the range of possible data channels may be downloaded and stored in the terminal/module for this process.

Recalibration of a set top terminal/module transmitter may be initiated by the system manager when received signal strength indications for a particular transmitter are detected as too high or too low in comparison with an optimum level or range of levels. Also, while a system manager can initiate calibration, a set-top terminal upon power-up or upon activation through a particular key sequence may initiate a request to the system manager for calibration.

In accordance with the invention of the above-referred copending application, a method of transferring a data message from a remote unit to a central location is provided. First, a plurality of data channels is selected for transmitting the data message from the remote unit to the central location. At least one random transmit time for transmitting the data message is then generated for each of the plurality of data channels. The data message is then transmitted over the plurality of data channels at the transmit times.

Also in accordance with the invention of the above-referred copending application, a remote unit for transferring a data message to a central location is provided. The remote unit includes a signal generator for generating signals within a predetermined range of frequencies. A channel selector selects a plurality of data channels within the predetermined frequency range. A random time generator generates at least one random transmit time for transmitting the data message for each of the plurality of data channels. A transmitter transmits the data message over the selected plurality of data channels at the transmit times.

These and other features of the present invention will be readily understood by one skilled in the art from the following detailed description when read in connection with the drawings.

BRIEF DESCRIPTION OF THE DRAWINGS

FIG. 9 representing the front end module, FIG. 10 representing the frequency synthesizer, FIGS. 11A-C representing the RF receiver, FIG. 12 representing the signal strength analyzer and FIG. 13 representing the controller assembly.

DETAILED DESCRIPTION OF THE INVENTION

Figure 1:
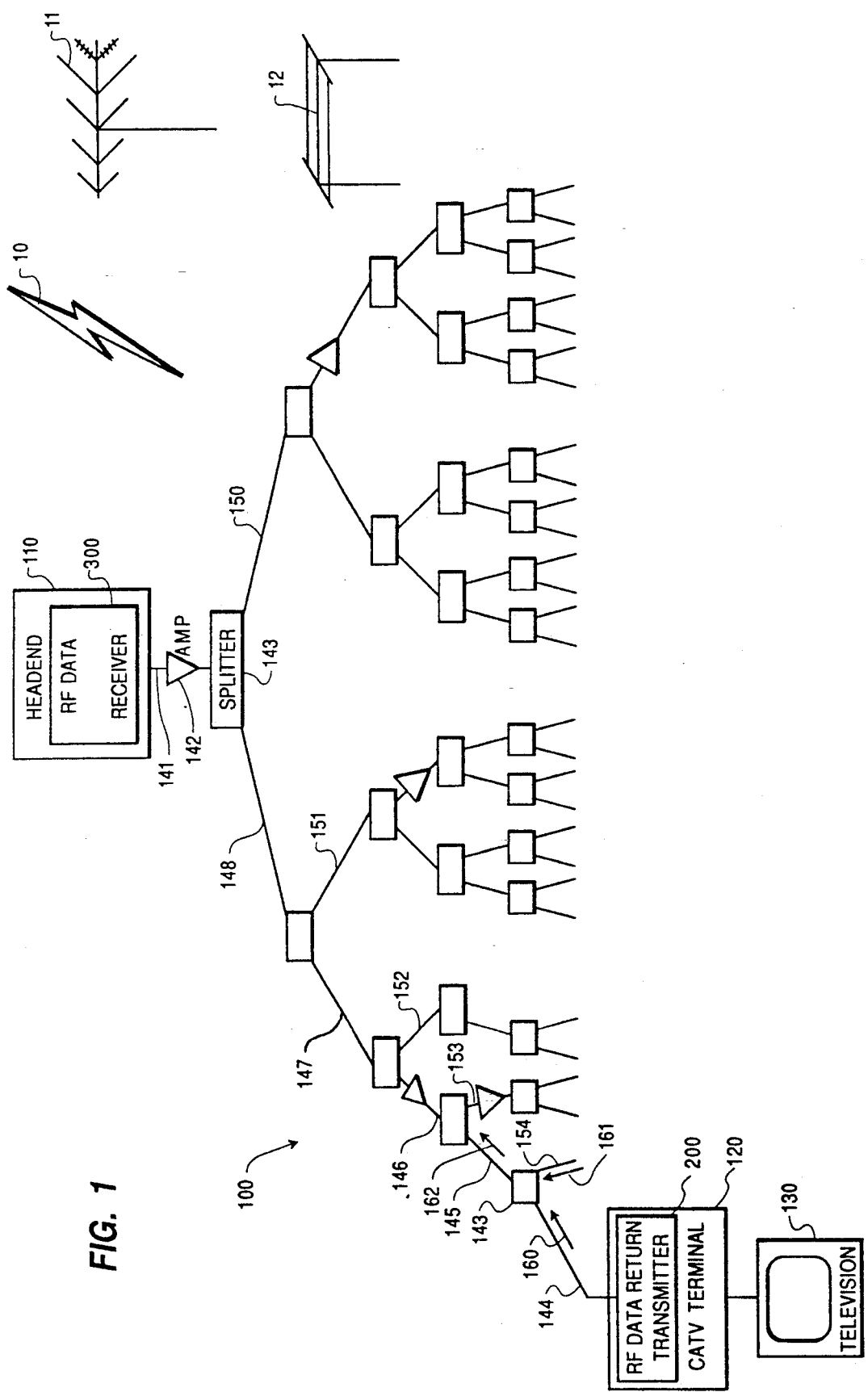
FIG. 1 is an overview block diagram depicting a CATV distribution plant with bidirectional distribution amplifiers and splitters enabling connection of a CATV subscriber terminal, including an RF data return transmitter of the present invention, to a headend including a frequency diverse data receiver according to the present invention.

FIG. 1 shows a typical cable TV distribution plant 100 for distributing cable television signals to a subscriber and for receiving upstream messages from a subscriber terminal 120. The CATV plant 100 connects a headend 110 to a plurality of subscriber's televisions 130 through CATV terminal 120. CATV plant 100 is connected in a "tree" configuration with branches 148' and 150 using splitters 143. Occasionally, at the location of splitters 143, bridger switchers are used to switch communication between headend and subscriber to only one branch of the upstream input to the splitter 143. It is one object of the present invention to eliminate any requirement for bridger switchers which have been used in the past for improving data throughput to the headend from the subscriber. In the downstream direction, a plurality of subscribers typically receive the same signal sent from the headend 110, typically a broadband CATV signal. In future systems with increased bandwidth such as optical fiber systems, it is not unlikely that different subscribers may receive different signals intended only for them, a province previously reserved only to telephone companies. Distribution amplifiers 142 are also regularly distributed along cable plant 100 to boost or repeat a transmitted signal. A transmission from headend 110 to the subscriber at CATV terminal 120 is susceptible to noise introduced along the trunk line 141 and branch lines 148, 147, 146, 145 and drop 144. However, by far the more serious noise ingress occurs in transmission from the subscriber to headend 110.

Frequency diverse RF data return transmitter 200 may be included in or associated with CATV terminal 120 and allows a subscriber to communicate with headend 110 by transmitting messages upstream in the CATV plant. Headend 110 includes frequency diverse RF data receiver 300 for receiving messages transmitted by RF data return transmitter 200 in CATV terminal 120 or in an associated module located at any or all of the plurality of subscribers. Other customers provided with IPPV or other services requiring data return may be provided with phone transmitters for communication with a phone processor (not shown) at the headend.

Many CATV plants are so-called split systems equipped for two-way transmission, that is, transmission from headend to subscriber and from subscriber to headend. In these CATV plants, amplifiers 142 are equipped for bidirectional transmission including reverse path amplification. Two-way transmission in CATV plants heretofore has been avoided by cable television companies in part because upstream transmission from the subscriber to the headend is significantly more susceptible to interference noise. Upstream communication is more susceptible to interference noise because a CATV plant is configured in a "tree" configuration allowing interference noise from every point in the CATV plant to be propagated and amplified in the upstream direction. This may be referred to as the funneling effect. For instance, interference noise 160 and 161 on lines 144 and 154 will combine into interference noise 162 at splitter 143 connected to drop 144 and branch 154. As the signals travel toward headend 110, the noise will combine with noise on branch lines 153, 152, 151, 150 and every other line in the entire CATV plant. In the upstream direction, it can become difficult to discriminate a transmitted data signal at headend 110 from the noise induced in each branch of the CATV plant.

Interference noise can include impulse noise, common mode distortion, ingress and amplifier non-linearities. Lightning 10, radio broadcasts 11, and power lines 12 are exemplary sources of interference noise. CATV plants may contain old and faulty grounded and bonded cable sheaths or the like which allow noise to enter anywhere in the CATV plant. Aging splitters 143 or old, non-linear amps 142 may also cause interference noise. Because interference noise from each and every branch of the CATV plant affects upstream transmission while interference noise along only a single downstream line (for example, 141, 148, 147, 146, 145, 144) affects downstream transmission, an upstream CATV plant as it ages will require costly maintenance sooner than a downstream CATV plant. The present invention allows transmission of upstream communication signals on an "imperfect" CATV plant where upstream transmission was heretofore difficult without costly routine maintenance of the CATV plant. The present invention allows bidirectional transmission of messages in a CATV plant much noisier than heretofore possible.

Figure 2:
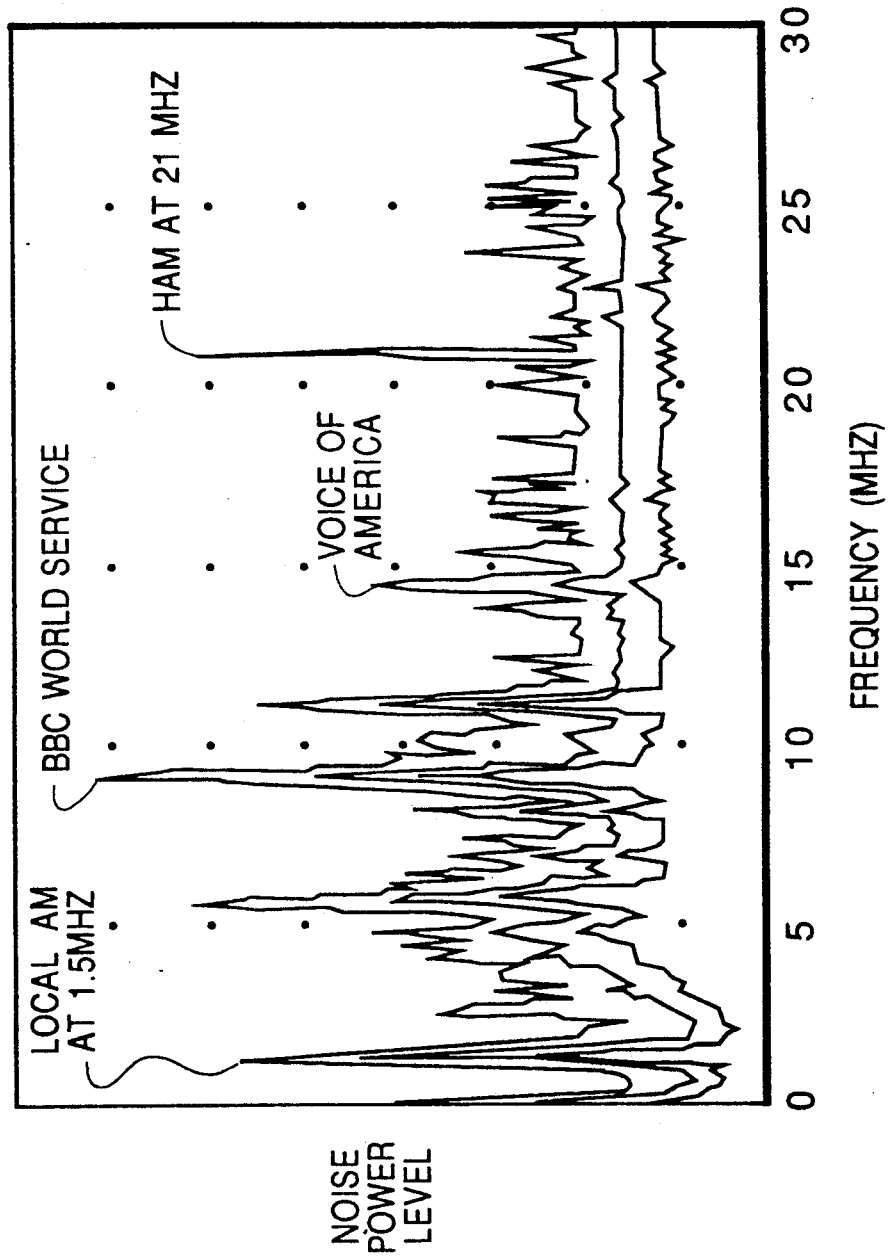
FIG. 2 is a plot of noise level versus frequency over the upstream 0-30 megahertz band of one typical CATV distribution plant.

Referring now to FIG. 2, there is shown a graph of noise power level versus frequency for a typical cable television plant. The measurements were taken at prime time viewing (evening) on a relatively new installation. The effects of ingress are seen to be especially severe in the measured plant from a local AM station at 1500 kilohertz, the British World Service, the Voice of America and a ham operator broadcasting at 21 megahertz. It can be quickly seen that transmission by known techniques on channel T7 (5.75-11.75 megahertz) would be practically impossible. Furthermore, it may be generally seen from the distribution that the higher the frequency, the less troublesome the interference noise.

The effects of common mode distortion were not particularly severe at the time of the measurements. However, the plant was again examined approximately one year later and peaks due to common mode distortion were predictably seen at 6, 12, 18 and 24 megahertz.

Figure 3:
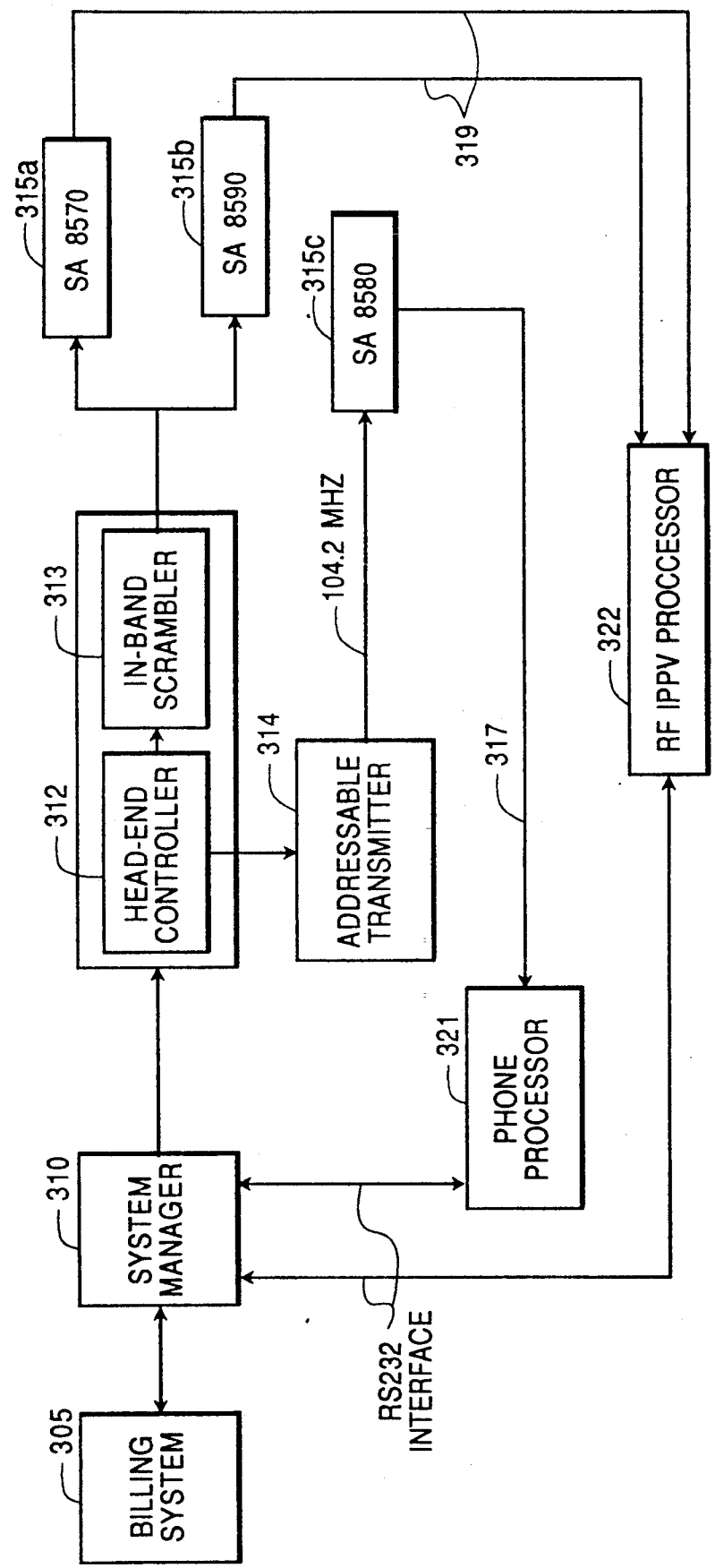
FIG. 3 is a system block diagram showing the several components of a system according to FIG. 1, including a billing system, the system manager, the frequency diverse RF data return receiver, and the set top terminal and its associated RF data return module.

FIG. 3 is an overview of the RF-IPPV system in accordance with the present invention. The system includes a billing computer or system 305 which records and maintains records for each system subscriber. The records typically contain information such as the subscriber's name, address, and telephone number, the type of equipment the subscriber has in his possession, and which pay services the subscriber is authorized to view. Typically, the cable operator either owns the billing computer, leases the equipment from a vendor who specializes in this type of equipment, or shares computer time on a machine owned by a billing vendor.

Billing computer 305 is interfaced to system manager 310. System manager 310 controls the operation of the cable system. System manager 310 maintains a list of all the addressable set-top terminals in the cable system as well as those services which each terminal is authorized to receive. System manager 310 also defines and maintains the parameters selected by the cable operator for each system. These parameters may include the frequencies associated with each CATV channel in the system, which channels are being scrambled, the security features of the system, and the system time. Additionally, system manager 310 is responsible for the authorization and deauthorization of pay-per-view events in the system.

System manager 310 also stores IPPV information. A resident program of the system manager reads the IPPV transactions uploaded from the set-top terminals in the cable system. The IPPV transactions are stored in a data base of the system manager until they are retrieved by billing computer 305. System manager 310 controls the reporting back of IPPV purchase information by transmitting data requests to the set-top terminals in the cable system.

As illustrated in FIG. 3, commands generated by the system manager may be transmitted to the set-top terminals in one of two ways. In a first technique, an addressable transmitter (ATX) 314 transmits the commands from system manager 310 (optionally via headend controller 312) on a dedicated channel (e.g. 104.2 MHz) in a format recognizable by the addressable set-top terminals. In a second technique, the commands are transmitted using a so-called in-band system where the commands are included in the video signal via the action of in-band scrambler 313. An in-band system is described in commonly assigned copending application application Ser. No. 188,481, incorporated by reference herein. Other techniques may be used as well for addressably or globally transmitting data from the headend to the subscriber set-top terminal, and the present invention should not be construed to be limited in this respect. For example, data under audio, data over audio, spread spectrum, or other techniques may be implemented over the same cable or an equivalent group of alternatives may be implemented over a switched or private telephone or power line.

Subscribers in the cable system may be provided with a set-top terminal 315. FIG. 3 illustrates three set-top terminals, two of which (315a, 315b) are associated with the in-band system and one of which (315c) is associated with the out-of-band system. For example, set-top terminals 315a and 315b may comprise Scientific Atlanta Model 8570 and 8590 set-top terminals while set-top terminals 315c may comprise a Scientific Atlanta Model 8580 set-top terminal. The set-top terminal allows the subscriber to tune and descramble the services requested from the cable system operator. Each set-top terminal includes a unique digital identifier, such as a digital address, which permits the cable operator to send commands directly to an individual set-top terminal. These commands are called addressable commands. The set-top terminals are also capable of receiving global commands processed by all the set-top terminals in the cable system. Subscribers who are authorized to purchase impulse-pay-per-view events are issued set-top terminals with an impulse module included therein. Briefly, the impulse module allows the subscriber to authorize his set-top terminal to receive a pay-per-view event, store the data associated with the purchase of the event, and forward the stored data to the cable operator. As indicated in FIG. 3, the stored data may be transferred back to the cable operator by a telephone impulse module using the public switched telephone network 317 via phone processor 321 or by an RF impulse module using an RF return path 319 via RF-IPPV processor 322. The RF data return path will be discussed in greater detail below. Phone processor 321 and RF IPPV processor 322 are coupled to system manager 310 through an appropriate interface, such as an RS-232 interface.

Billing computer 305 transmits a transaction to system manager 310 which identifies whether a particular set-top terminal in the system utilizes RF return path 319 or utilizes the telephone return path 317. System manager 310 then downloads a transaction to set-top terminal 315 to enable and configure the set-top terminal. For example, an RF impulse module must be loaded with the frequencies it will utilize for the RF transmission and calibration procedures described in detail below. These frequencies may be placed in the module at the time of manufacture or may be loaded with a global transaction from system manager 310. Alternatively, the frequencies may be loaded by an addressable command.

Figure 4:
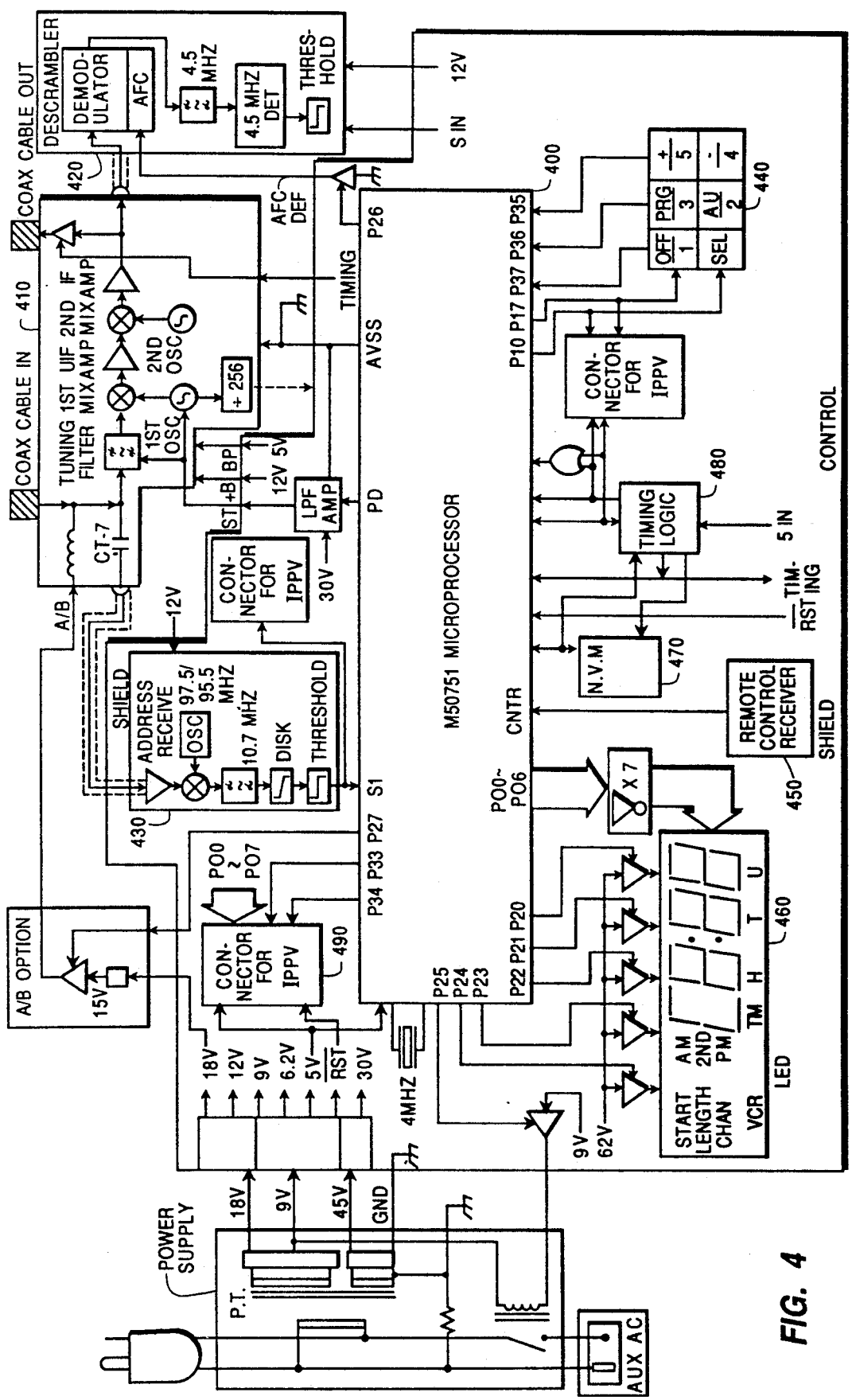
FIG. 4 is a schematic block diagram of a typical set-top terminal (STT), the particular terminal shown comprising an out-of-band addressed command receiver.

FIG. 4 illustrates a block schematic diagram of a conventional addressable set-top terminal known in the art, namely, a Scientific Atlanta 8580 set-top terminal. According to the principles of one embodiment of the present invention, the set-top terminal is a passthrough device and plays no part in the present invention. Through a port of microprocessor 400, microprocessor 400 merely reports all commands received through addressable data receiver 430 to a microprocessor 504 of an associated RF-IPPV data return module illustrated in FIG. 5 via IPPV connector 490. In an alternative embodiment, the functions of microprocessor 504 of the module of FIG. 5 may be incorporated into microprocessor 400, in which instance a larger capacity microprocessor than a M50751 would be required.

The basic building blocks of an out-of-band addressable set top terminal are a down converter and tuner 410 for receiving and downconverting the incoming cable signal. The data receiver 430 accepts a downconverted out-of-band 104.2 MHz or other appropriate data carrier from the downconverter 410. The downconverted television signal output of the downconverter is descrambled at descrambler 420 as necessary. The descrambled channel is upconverted to channel 3 or channel 4 for input to a subscriber's television, video tape recorder or other subscriber apparatus (not shown).

Microprocessor 400 has associated NVM 470 and timing logic 480, a keyboard 440 for accepting direct inputs, an infrared or other remote receiver 450 for receiving remote control inputs, and a display 460. The display shows tuned channel number or time of day, for example.

Figure 5:
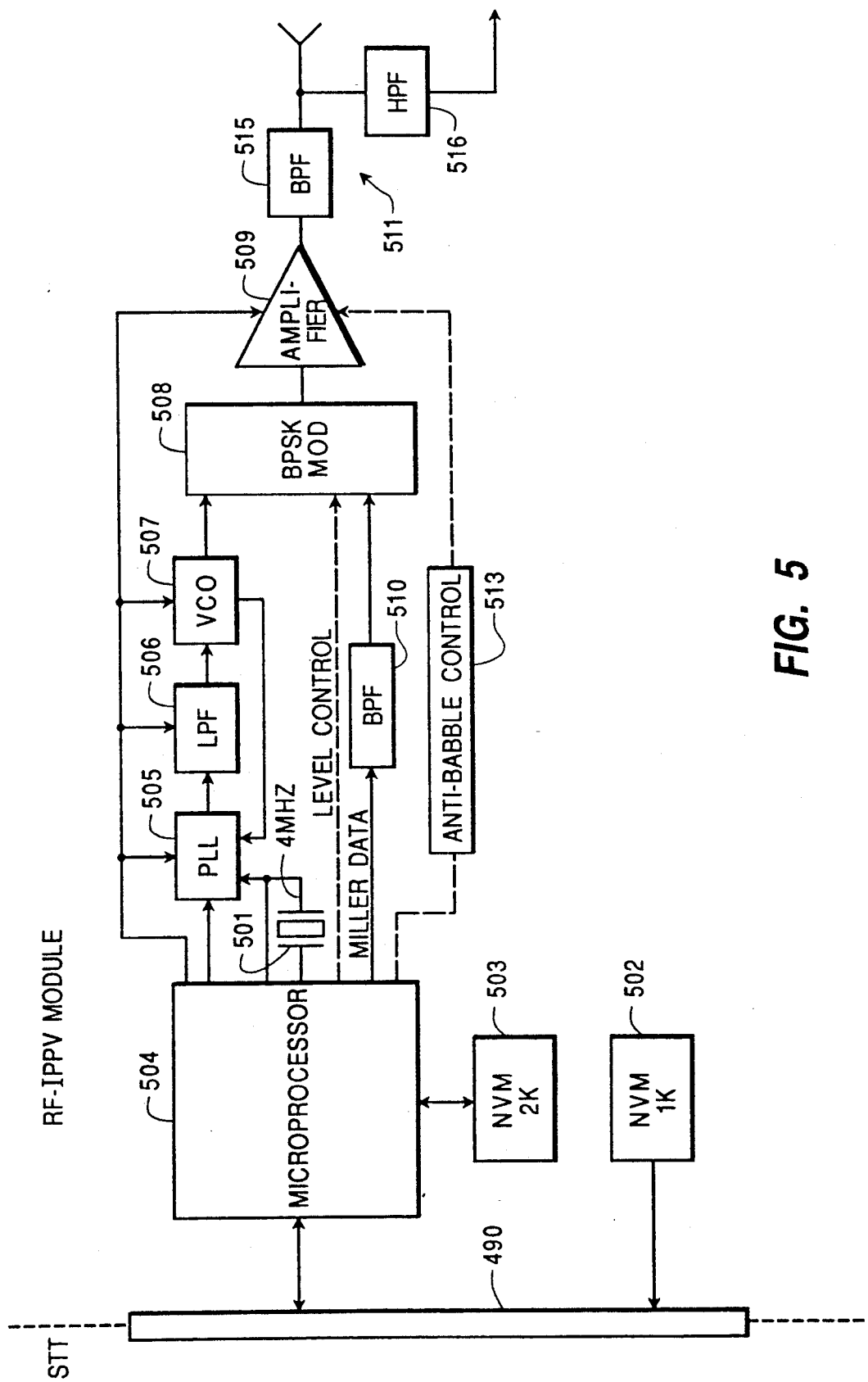
FIG. 5 is a schematic block diagram of an RF-IPPV module for the set-top terminal of FIG. 4, the module either comprising a part of the terminal or being connected to the terminal through an appropriate bus system.

The Model 8580 set-top terminal as described above is a mere pass through device for the purposes of the present invention. Each of Models 8570, 8590 and other set-top terminals of other manufacturers normally comprise processor controllers like microprocessor 400 which all must have ports or connectors for data exchange with a module as shown in FIG. 5 or for controlling the elements of FIG. 5 when the module does not include a microprocessor. NVM 502 of FIG. 5 is adjunct non-volatile memory which simply supplements the amount of memory provided by NVM 470 and is accessed by microprocessor 400.

In order to accomplish home shopping, energy management, meter reading, burglar alarm and other services besides IPPV service, a terminal must comprise appropriate interferences for data input/output to various principal devices in the subscriber's home (none of which are shown in FIG. 4).

FIG. 5 illustrates a block diagram of an RF-IPPV module in accordance with the present invention. The RF-IPPV module is a microprocessor-based BPSK transmitter used to send information through the reverse or upstream system of a CATV plant from a subscriber's location to the headend. Microprocessor 504 interfaces with set-top terminal microprocessor 400 to receive information to be stored in NVM 503 (for later transmission) or to receive transmission instructions. During the transmit cycle, microprocessor 504 switches on power to the frequency synthesizer circuitry, programs the appropriate frequency to transmit, turns on the final amplifier, sets the predetermined gain level at the modulator, and transmits the required information.

Microprocessor 504 is the "brain" of the module, determining when to transmit (based on instructions sent from the headend and discussed in greater detail below), determining and setting the frequency and power level of transmission, and encoding the data stored in NVM 503 for transmission. In order to assure prompt and efficient data return, data is preferably pre-formatted when stored in NVM 503. Upon completion of transmission, microprocessor 504 also switches the RF circuitry off, thus reducing the noise output of the module and reducing the overall power demand. NVM 503 stores the event data (preformatted for transmission), security information, transmit frequencies and power levels, and module identification information. NVM 503 also stores viewing statistics data as will be described in more detail below.

Phase-lock loop 505, lowpass filter 506, and voltage controlled oscillator (VCO) 507 synthesize the frequency which is used for transmission. The frequency is synthesized from a 4 MHz crystal clock 501 which also controls microprocessor 504. This arrangement reduces the number of parts required to complete the synthesis, as well as eliminates problems that could result from utilizing two different clocks of the same frequency.

Phase-lock loop 505 of the module accepts serial data from microprocessor 504 to set its registers for a particular frequency. Phase-lock loop 505 compares a sampled signal from the output of VCO 507 with a signal derived from 4 MHz clock 501 to determine whether the generated frequency is higher or lower than the programmed synthesizer frequency with a polarity representing a "high" or "low" generated frequency. LPF section 506 performs a mathematical integration of this signal, and generates a DC voltage to control the output frequency of the voltage-controlled oscillator VCO 507. The output of VCO 507 is fed to modulator 508, and also fed back to phase-lock loop 505, so it can be sampled again, and the process is repeated for the duration of transmission.

Data filter 510 is a bandpass type filter that prevents the high frequency energy of the digital information to be transmitted from being modulated into the RF carrier. Data filter 510 thus functions to contain the modulated energy of the modulated signal within specified limits.

Modulator 508 accepts filtered data input from microprocessor 504 and an RF carrier from VCO 507 and modulates the phase of the RF carrier proportional to the data signal. The modulator also utilizes a DC bias voltage created by a resistive D/A network to control the overall gain of the modulated signal. The D/A network is controlled directly by microprocessor 504.

Modulator 508 is described in greater detail below with reference to FIG. 6.

Three modulation schemes for RF data return were considered for implementation in the present invention: Binary Frequency Shift Keying (FSK), Binary Phase Shift Keying (BPSK), and Direct Sequence Spread Spectrum (DSSS) with BPSK modulation. Many schemes were considered too complex, and unnecessary, since bandwidth conservation is not a critical requirement.

Of the three, BPSK has the greatest immunity to broadband noise, DSSS has the greatest immunity to discrete frequency interference, and FSK is the simplest to implement. On the other hand, BPSK and FSK have little immunity to strong co-channel interference, but a DSSS receiver is fairly complex, and has a very large noise bandwidth. Also, a DSSS transmitter requires a very complex filter to prevent interference with both forward and reverse video. In addition, FSK receivers suffer (in this case) from "capture" effect which is a problem in this situation.

The system according to the present invention provides some of the best features of each. The system uses BPSK signalling on four different frequencies. This approach may be named Frequency Diversity BPSK (or FDBPSK). In this way, the noise bandwidth of the receiver is very small, the inherent noise rejection characteristics of BPSK are utilized, and, by judicious selection of frequencies, discrete interference is avoided. However, while BPSK modulation has been utilized in the present invention for the above reasons, other modulation techniques may be utilized and the invention should not be limited in this respect.

Final amplifier 509 amplifies the resultant signal from modulator 508 to the required output power level of the module. The amplifier gain is at a fixed level, with a signal from antibabble control 513 controlling the on-/off switching of amplifier 509.

Anti-babble control 513 is a circuit designed to allow microprocessor 504 to control the status of final amplifier 509. In the case of a failure of microprocessor 504, anti-babble control 513 inhibits final amplifier 509 after a predetermined period of time, or after several consecutive transmissions. This prevents the module from transmitting messages longer than designed, or more frequently than intended regardless of microprocessor state. Terminals which "babble" or "scream" are terminals which are out-of-control and generate noise messages which can tie up a whole system if permitted. An anti-babble circuit prevents babble by turning off a data transmitter after a predetermined period of time which is longer than the longest data message should require. The anti-babble control control 513 is described in commonly assigned U.S. Pat. No. 4,692,919 which is incorporated herein by reference thereto.

Diplex filter 511 is a filter with two distinct components: A 12–19 megahertz bandpass filter 515 for harmonic energy rejection of the module transmitter and a 54–870 megahertz high pass filter 516 for CATV signals to be passed to the set-top terminal undisturbed.

The design considerations associated with design of an RF-IPPV module for so-called "on-premises" systems are not particularly appropriate for design of so-called "off-premises" systems. The "on-premises" systems, for example, relate to in-band and out-of-band addressable set-top terminals such as the Scientific Atlanta 8570, 8580 and 8590 terminals. The "off-premises" environment presupposes the removal of set-top terminal equipment from the subscriber's premises. Such "off-premises" systems include, for example, interdiction and trap technologies. Consequently, for example, there is at least a house, if not a drop, cable separation between the cable television terminal and the subscriber equipment which may not be particularly suitable for data communication. On the other hand, some subscriber equipment is required for IPPV, home shopping and such two-way services not available with conventional television receiver apparatus. Consequently, the module of FIG. 5 which presupposes a bus or other inter-terminal/module communication path would be difficult to implement over conventional house or drop cables without some special data communication design. The present invention, then, is related to those principles of terminal/module design which may be extended from the design of an on-premises terminal to the design of an IPPV module for so-called off-premises interdiction and trap system subscriber units.

Figure 6:
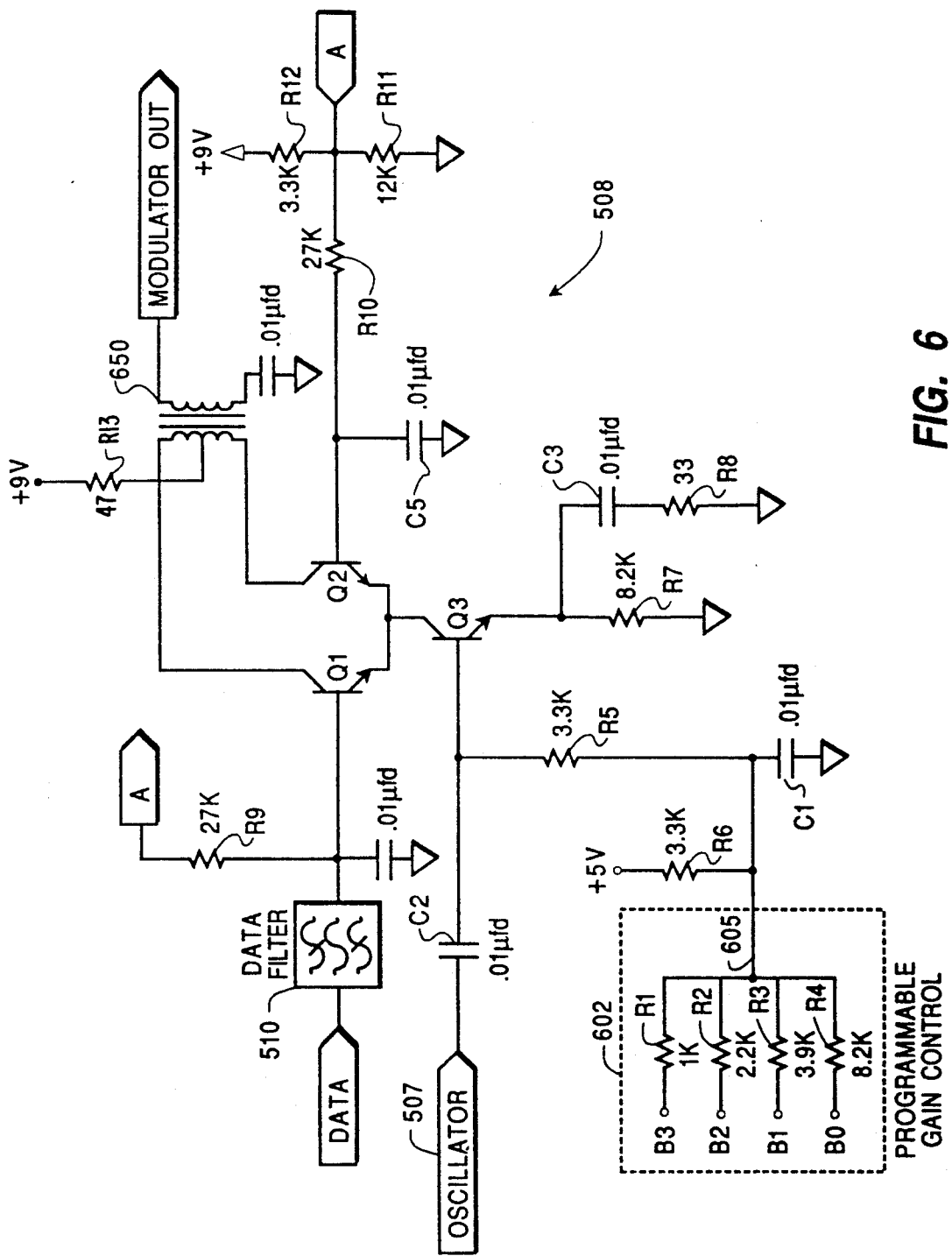
FIG. 6 is a schematic diagram of the BPSK modulator of the module of FIG. 5.

FIG. 6 illustrates the details of the BPSK modulator of FIG. 5. BPSK modulation is a type of modulation that alternates the phase state of an RF carrier in one of two possible states to represent one of two logic states. The BPSK modulation technique used in the RF IPPV transmitter of the present invention involves the use of a balanced differential amplifier to generate phase state changes in an RF carrier to represent encoded digital information. Although there are conceivably many possible approaches to realizing a modulator of this type, use of a differential amplifier as illustrated in FIG. 6 also provides a means of varying the overall gain of the circuit, thus allowing for microprocessor control of the output power level. By applying a constant level RF carrier at the base of Q3 in FIG. 6 and combining this signal with a DC bias voltage provided by a digital-to-analog converter controlled by microprocessor 504, a psuedo-linear power output control is integrated in a low cost BPSK modulator.

BPSK modulator 600 includes programmable gain control 602. Programmable gain control 602 includes four resistors R1-R4 of 1K Ω, 2.2K Ω, 3.9K Ω, and 8.2K Ω respectively. One end of each resistor R1-R4 is coupled to inputs B3-B0 respectively. The other end of each resistor is coupled to common output 605. The output 605 of programmable gain control 602 is coupled to the base of transistor Q3 through a 3.3K Ω resistor R5. A voltage of 5 V is coupled to a first point between the output of programmable gain control 602 and resistor R5 through a 3.3K Ω resistor R6. A second point between the output 605 of programmable gain control 602 and resistor R5 is coupled to ground through a 0.01 μfd capacitor C1. The output of oscillator 507 (FIG. 5) is coupled to the base of transistor Q3 through a 0.01 μfd capacitor C2.

The emitter of transistor Q3 is coupled to ground through an 8.2K Ω resistor R7. A point between the emitter of transistor Q3 and resistor R7 is coupled to ground through a 0.01 μfd capacitor C3 and a 33 Ω resistor R8.

The emitter of transistor Q1 is coupled to the emitter of transistor Q2. The collector of transistor Q3 is coupled to a point along the connection of the emitters. The input data is coupled to the base of transistor Q1 through data filter 510 (FIG. 5). A point between data filter 510 and the base of transistor Q1 is coupled to ground through a 0.01 μfd capacitor C4 and to 27K Ω resistor R10 through a 27K Ω resistor R9. The leads "A" represent a coupling of together of the points.

A point between resistors R9 and R10 is coupled to ground through a 12K Ω resistor R11 and to an input of +9 V through a 3.3K Ω resistor R12. A point between resistor R10 and the base of transistor Q2 is coupled to ground through a 0.01 μfd capacitor C5.

The collectors of transistors Q1 and Q2 are respectively coupled to the primary terminals of transformers 650. +9 V is coupled to the midpoint of the primary winding of transformer 650 through a 47 Ω resistor R12. One terminal of the secondary of transformer 650 is the modulator output and the other terminal is coupled to a ground through a 0.01 μfd capacitor C6.

The operation of modulator 600 will now be explained.

Modulator 600 takes scaled data input from microprocessor 504 of FIG. 5 and filters the data to reduce high frequency content. The filtered data waveform changes the collector current of transistor Q1 to one of two possible states, representing either a digital one or zero. The base of transistor Q2 is maintained at a constant voltage.

Oscillator RF is input to the base of transistor Q3. The collector current of Q3 is held at a constant level determined by the voltage output of the programmable gain control digital/analog converter resistor network 602. Since the RF collector current of Q3 is held constant, the total emitter current from transistors Q1 and Q2 must equal the current in transistor Q3. The collector current in Q1 is varied in proportion to the data signal at the base thereof, thus varying the collector current in Q2 in an opposite manner to keep the total current a constant. The RF current from the collectors of transistors Q1 and Q2 creates a differential voltage across the primary terminal of transformer 650. The differential RF signal is converted to a single-ended signal by transformer 650, creating an RF carrier which changes polarity (phase inversion) proportional to the data signal at the base of Q1. This is the BPSK signal that is amplified and transmitted.

The gain control function in the modulator is a result of the bias voltage present at the base of transistor Q3. This DC bias voltage, when combined with the RF signal from the oscillator, creates a collector current (and gain level) proportional to the bias voltage. Thus, when the DC bias level is increased as a result of the programmable gain control resistor network 602, the gain of the RF signal at transistor Q3 is also increased. Programmable gain control resistor network 602 is designed to have a complementary DC response with digital input to create a linear increase in RF power at the output of the modulator. In other words, for each incremental increase of the four-bit digital signal, the output power of the modulator will increase a fixed incremental amount.

The operation of the various above-described components in accordance with features of the present invention will now be described.

As discussed above, to report IPPV event purchase information back to system manager 310, each set-top terminal or STT 315 must have a reverse communication path (as opposed to the forward path used to send control information from system manager 310 to STT 315). As mentioned earlier, an RF-IPPV system is intended to be used in cable plants which have reverse sub-split channel capability. These cable systems have trunk amplifiers which allow the T7, T8, T9, and T10 (approximately 0-30 megahertz) channels to propagate in the reverse direction, i.e. into the headend.

The present invention provides an RF IPPV module as shown in FIG. 5 which utilizes a portion of the T8 channel to communicate from the terminals or modules to a frequency diverse data receiver in the headend via a selectable plurality of modulated RF data carrier channels. Use of the T7, T9 and T10 channels for video conferencing or other communication is not adversely affected by the data communications which are generally confined to the T8 channel band.

Use of the reverse channels in a cable plant as a data communications network for retrieving subscriber information from terminal locations suffers from two primary drawbacks: the high noise and interference environment of upstream communications as discussed in detail above and a lack of an access contention mechanism through which data may contend for access to the network. Both problems stem from the topology of the system, which is an inverted tree as shown in FIG. 1.

From an interference standpoint, the branches of the "tree" can function as a large antenna network. Faulty shielding and cracked or loose connections in the cable system allow RF interference to "ingress" into the system as described above. Because the trunk amplifiers are preset to provide overall unity gain, the in-band interference and noise is regenerated at each of the amplifiers. Furthermore, in the reverse path, interference and noise from each branch is additively combined at each trunk intersection. The result is that all of the interference and noise picked up throughout the cable system is ultimately summed at the headend, where the RF-IPPV data receiver is located. To minimize these problems inherent in the use of reverse cable TV channels for data communications, a plurality of four channels of a range of twenty-three (23) 100 KHz data channels in the T8 television channel bandwidth are selected for use in the present RF-IPPV system based primarily on data throughput considerations. As will be described further herein, the present invention should not be construed as limited to four channels but may utilize more than four channels. The probability of receiving messages increases with each additional channel utilized, but the costs of providing additional transmitters and receivers for additional channels becomes prohibitive by comparison.

The 6 MHz reverse video channel is divisible into sixty 100 kHz wide communication channels, of which twenty-three (23) are utilized in a current implementation. Four of the twenty-three channels are selected based on the frequency location of noise and interference. Both the transmitters and receivers are frequency-agile. The frequencies used for reverse communication can be automatically programmed by the system manager computer to avoid channels which are noisy or contain significant interference. These frequencies can be changed as often as necessary to deal with time varying interference.

Each transmitter will successively transmit its data preferably at a data rate of 20 kilobits/second on each of the four frequencies. At the headend, four RF receivers (one tuned to each channel) are used. This arrangement provides redundancy for each message. The probability of error due to co-channel interference is now the product of the four probabilities that each of the four channels has interference present at the time of the transmitter's use of that channel. This results in a very high transmission/reception success rate.

Note that this can provide even better performance than that of spread spectrum systems, since the sequential transmission scheme provides some time diversity as well as frequency diversity.

FREQUENCY SELECTION

In a typical reverse system, there are four video channels available: T7, T8, T9 and T10. Usually, the lowest channel (T7) is the noisiest and the highest channel (T10) is the quietest. This would suggest that T10 would be the best choice. However, there are other considerations.

Many cable operators either use or are required to keep available several of the reverse channels. These are sometimes used for video conference links, community access TV, character generator links to headends, and modem service. Since video is far more intolerant of noise than data transmission, it is desirable to leave the "cleanest" channels open, and use one of the lower channels.

Data obtained from direct observation of several customer reverse plants indicates a significant deterioration of channel quality from T8 to T7. Although a BPSK system could probably operate in T7, it will generally be far easier to locate clean frequency bands in T8.

The last factor involved in frequency selection is the location of transmitter harmonics. It is important to keep the second and third harmonics of the transmitters out of both the upper reverse channels and the forward video channels. If the transmitter frequencies are restricted to the range of 14 to 18 MHz, the second harmonics ($2 \times f^o$) will be between 28 and 36 MHz, and the third harmonics ($3 \times f^o$) will be between 42 and 54 MHz. The second and third harmonics will then be out of both the forward and reverse video channels (above T10 and below channel 2). This considerably reduces the transmitter output filtering requirements, thereby significantly reducing cost and increasing reliability. Thus, the T8 channel is chosen, unlike Citta et al., to intentionally avoid carrier harmonics which can adversely affect upstream transmission at odd and even harmonics falling in the upper portion of the 0–30 megahertz transmission band.

The ingress interference sources are typically discrete frequencies and are time varying in nature. Although averaged spectrum analyzer measurements can indicate areas or bands of the T8 channel which may be completely undesirable at one particular point in time, it is still difficult to predict with certainty which frequency or frequencies to use at all times. At any given time, however, there is typically considerable bandwidth within the T8 channel with low enough noise and interference levels to support reliable communications. The present frequency diverse RF-IPPV system is designed to utilize this fact and avoid the interference through several complimentary techniques: minimal bandwidth data communication techniques, frequency diversity, multiple (simultaneous) communication channels, and time randomized redundant message transmissions.

The RF module of FIG. 5 transmits IPPV event data on as many as four different channels (frequencies) each time it attempts (or retries) to return data. The actual number of frequencies used is programmable, on a per head-end basis, from one to four in current implementations, although the invention is not limited in this respect. The frequency agile nature of the system allows the return system to be programmed to operate in channels (frequencies) that do not have strong steady state interference. In addition, the use multiple frequencies avoids random and time varying interference sources.

For example, when a system is initially set up, a spectrum analyzer can be used to find several usable 100 kHz channels in the 15.45–17.75 MHz frequency range which have, on the average, low interference levels. However, at any given point in time, there is always some probability that a random or time varying noise source may interfere with a data return transmission. The probability of interference occurring in one channel is, furthermore, relatively independent of interference occurring in another (non-adjacent) channel.

To illustrate, assume that the probability of harmful interference occurring during any transmission on any channel is 50%. Thus, no more than half of the bandwidth of any channel may be utilized. From another perspective, the probability of getting a return data message through is only 50%. However, if essentially simultaneous attempts are made to send the message on a plurality of channels, an attempt will be unsuccessful only if the attempts on each channel are unsuccessful. In other words, the only way that at least one message attempt will not be successful is if all four attempts are unsuccessful. The probability of this occurrence if four channels are utilized is:

$$0.5 \times 0.5 \times 0.5 \times 0.5 = 0.0625 (6.3\%)$$

or only one eighth of the 50% probability of a failure when using only one channel. In general, if the probability of failure due to interference on one channel is K, then the probability of failure using four channels is $K^4$. The relative improvement is then $K/K^4$ or $1/K^3$.

The System Manager, the RF-IPPV Processor (RFIP) and the RF-STT module store two sets of (up to) four usable channels in a current implementation. These two sets of channels are referred to as the "Category 1 frequencies" and the "Category 2 frequencies". It will be apparent to those of skill in the art that the present invention is not limited to two categories of frequencies, each category comprising four frequencies. Rather, any number of categories may be used, each category containing the same or different numbers of frequencies. Commands to the RF IPPV Processor and RF-STT from the system manager can instantly switch operation from one set of operating frequencies to another. Alternatively, the system manager may be programmed to automatically cyclically switch system operation among categories at different times during the day.

In a current implementation, two different operating modes are instantly available at all times without disrupting operation. For example, Category 1 may define three channels for data return and one channel for automatic RF-STT module calibration, while Category 2 may define four channels usable for data return. During the daytime hours because installations are typically taking place, the system may be programmed to use Category 1 so that automatic calibration can occur. During the night, the system may be programmed to use Catergory 2 in order to maximize utilization of the advantages of multiple data return channels.

If the relative quality of certain return channels are known to vary significantly during certain periods of the day, the two categories can be used to switch one or more channels quickly and automatically at pre-programmed times. For example due to an interfering radio transmitter, channel "A" may be much better than channel "B" from 4:00 AM to 6:00 PM, but somewhat worse than channel "B" at night (6:00 PM–4:00 AM). It is then advantageous to assign channel "A" to one category and channel "B" to the other and program the system to switch to the appropriate category at 4:00 A.M. and 6:00 P.M.

Assuming low noise over a plurality of channels, a lower number of return data channels may be utilized without compromising data throughput. Thus, different groups may transmit over different channels within the same category.

The RF IPPV Processor and System Manager jointly collect and maintain statistics on the number of valid, non-unique messages received on each of the four RF channels. The number of messages transmitted on each (used) channel by the RF-STTs is essentially equal. Therefore, when accumulated over a statistically significant period of time, the number of valid messages on each utilized channel should tend to be equal if the quality of each channel is equivalent. Conversely, if the quality of one or more channels is lower than others, the number of valid received messages on these lower quality channels will be lower than the number received on so-called cleaner channels. This implies that the cumulative totals of non-unique messages received for each channel are excellent indicators of relative channel quality. Quality can be compared from channel to channel on a short term basis as well as analyzing long term trends on single channels.

Although current implementation allows only for cumulative message count totals to be displayed during each callback zone, this information, along with the other features of the system, may be used to implement an automatic frequency selection process. For example, the following algorithm would eventually try all of the channel frequencies and use the best four:

1. Pick four apparently "good" frequencies to begin.
2. Analyze data return performance for a statistically significant period of time.
3. Remember the relative quality of the "worst" frequency and remove it from use.
4. Replace "worst" frequency with an untried frequency.
5. Repeat steps 2 through 4 until a ranking of all usable frequencies has been determined.
6. Continue to use the above algorithm, except only select from the "n" best ranked frequencies when replacements are needed.

This algorithm is readily adapted to systems utilizing more or less than four channels.

The present RF-IPPV system utilizes Miller (delay) data encoding with binary phase shift keying (BPSK) carrier modulation. The Miller data encoding gives excellent recovered data timing information while using minimal bandwidth.

When an RF-STT receives a data return request from the system manager, the message tells the RF-STT which category of frequencies to use, how many times ("N") to send the message, and how long the transmit period is. The RF-STT then calculates "N" pseudorandom message start times, within the specified transmit period, for each of the frequencies in use. The data return message is then transmitted up to "N" times on each of the frequencies. The start times are calculated independently for each frequency, so that both the message start time and the frequency order are random. Sending each message at random times on a particular frequency is primarily a function of the statistical media access technique used (see the following section on media access protocol). The message redundancy afforded by multiple transmission attempts on multiple transmit frequencies is a primary factor in providing ingress noise immunity. This technique is essentially a frequency hopping spread spectrum system, although the frequency hopping is slow with respect to the data as compared with known spread spectrum technology.

To utilize the multi-frequency capability of the RF-STT transmitters, the RF-IPPV Processor contains four separate receiver sections which can simultaneously receive data messages. At the beginning of each data return group period, the system manager sets the RF-IPPV processor frequency category to insure that they correspond with the RF-STT's. A microprocessor-based control unit in the RF-IPPV processor decodes the data messages from each receiver. The messages are organized into packets and forwarded to the system manager. The control unit of the RF-IPPV processor also sorts the messages to remove the redundant messages received from RF-STT's during each transmit period.

IPPV MEDIA ACCESS DATA RETURN PROTOCOL

In the operation of an IPPV cable system, it is generally desirable to be able to request a data return message or "poll" the STTs equipped with RF-IPPV modules (RF-STTs) based on several different criteria. The following list summarizes the most useful cases for requesting data return from specific groups of STT's:
1. Unconditionally, i.e., all RF-STTs must report;
2. All RF-STTs storing IPPV data for one or more events;
3. All RF-STTs storing IPPV data for a specific event; and
4. Specific RF-STTs on an individual basis (regardless of event data).

Furthermore, as stated earlier, it is very important that, even in the first (unconditional data request) case, all RF-STTs be able to return the data within a period of no more than 24 hours. This should be possible with RF-STT populations of thousands or even several hundreds of thousands, and translates to a "throughput" goal of some twenty-five thousand RF-IPPV data responses per hour.

Each of the reverse narrowband data channels can only carry one message at a time. That is, if two or more RF-STTs anywhere on a particular cable system send messages that overlap in time, the transmissions will interfere and all data messages involved in the "collision" have a high probability of being lost. Therefore, in three of the cases shown above, some type of media access control procedure is required to prevent a plurality of RF-STTs from attempting to use a data return channel simultaneously.

Of course, all of the cases could be handled as a series of individual data requests (like the fourth case). However, this is not consistent with the throughput goal due to system message delays incurred in the typical "round trip" request/response message sequence. It is much more efficient to send a single "group data request" to relatively large groups of RF-STTs which then return data according to a planned procedure or "media access protocol". This protocol must insure a high rate of success, that is, no collision involvement, for messages.

Unfortunately, popular media access protocols such as are used in local area networks which rely on carrier sense mechanisms to help prevent transmission collisions are unsuited for use in a cable system. The inverted tree topology of cable systems sums transmitted signals from different branches and propagates them toward the headend. RF-STT's that are located in different branches, each of which is isolated by a trunk amplifier or other device, cannot detect the presence of an actively transmitting RF-STT in another branch.

Another access protocol, time slotting, also suffers from the worst case variance in system message delays. This forces the time slot for each RF-STT to be unacceptably long, resulting in poor throughput.

All of the items above have led to the development of a media access protocol which gives an acceptably high throughput rate by having a calculated tolerance for collisions. The method utilizes the predicted statistical probability for collisions (and conversely for successful message throughput) given a controlled, evenly distributed random RF-STT data return attempt rate.

In very simple terms, this involves the system manager sending out a data request for each manageably sized sub-group of the total RF-STT population. (These subgroups are independent of the four polling cases listed above.) Each subgroup or simply "group" has a defined period of time within which to return data. Within this period, each RF-STT independently picks a programmed number of (pseudo) random times to begin a data return transmission. For the relatively large subgroups used, the return attempts are statistically evenly distributed over the period. Furthermore, since the average attempt rate is predetermined and the average length of a return message is known, the resulting probability for at least one successful data return message for any RF-STT is predictable.

Although the above statistical concept is the basis of the data return method, a number of other key elements are required to make the process workable. These are summarized below:
1. An optimal attempt rate is determined which gives the best effective data return throughput.
2. The overall RF-STT population on each cable system headend is divided into manageable sized groups of known size. The size and number of subgroups, as well as the data return period can be determined given the optimal attempt rate.
3. A data return plan is required which provides structure to the manner in which system manager requests return data from the individual groups.
4. A set of rules governs how the RF-STTs within the groups respond to data return requests and data acknowledgments within the data return sequence.

DATA RETURN SEQUENCE

Figure 7:
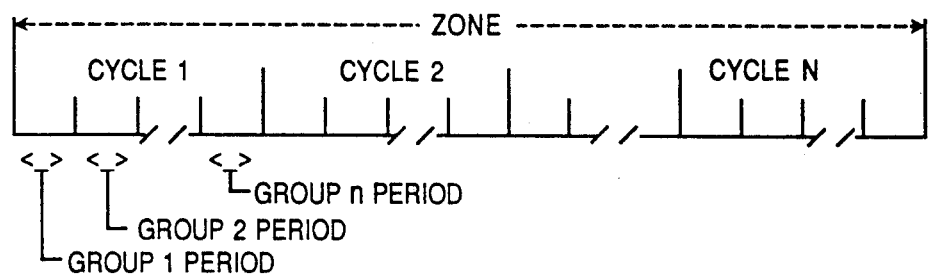
FIG. 7 is a diagram of the timing for the data return sequence from a frequency diverse RF data return transmitter according to FIG. 5.

FIG. 7 shows a time line representation of a typical data return sequence. As mentioned above, the total RF-STT population is divided up into manageable subgroups of approximately equal size. These are simply referred to as groups. The length of time that each group is allowed to return data in is called the group period (or simply the period). During RF-IPPV data retrieval, the system manager sequentially sends a data request to each group in a cable system headend. One complete data return sequence of all groups is referred to as a cycle. Finally, a sequence of two or more cycles that make up a complete (typically daily) data return sequence is called a zone. If an RF STT returns its data during a given zone and receives an acknowledgment, that RF STT will not retry during that zone. Each group data return request sent out by the system manager includes the group number and the current cycle and zone numbers.

There are two types of auto-replies: global and addressed. Global auto-reply may be further broken down into cyclic and continuous auto-reply. In a cyclic auto-reply, the user defines a time interval during which the RF-IPPV modules will respond. In a continuous auto-reply, the system defines the time interval, such as 24 hours. With reference to FIG. 7, in either a cyclic or a continuous auto-reply, the time interval is called a zone. Each zone is assigned a unique number so an RF-IPPV module may ascertain whether it has already responded during a particular zone. Each zone is subdivided into a plurality of cycles. A cycle is defined as the amount of time required for entire population of RF-IPPV modules to attempt to reply. Each cycle is assigned a unique number (within a zone) so an RF-IPPV module may ascertain whether it has already responded during its cycle. Due to RF collisions, all RF-IPPV modules may not get through to the RF receiver. In order to increase the probability that a particular RF-IPPV module will get through to the RF receiver, a minimum number of cycles per zone may be defined. The minimum number of cycles per zone is configurable.

Each cycle is subdivided into groups. A group is a subset of the total population of RF-IPPV modules in the system. Each RF-IPPV module is assigned to a particular group and has an associated group number. The group number may be assigned to the RF-IPPV module via an external source (user defined) or can be derived from the digital address through the use of a shift value as described in greater detail below. Regardless of how its associated group number is derived, an RF-IPPV module will only respond during its group time. Each RF-IPPV module is further assigned a configurable retry number. The retry number represents the number of times a given RF-IPPV module will attempt to respond during its group time.

The reply algorithm of the present invention will first be described in general and subsequently will be described in particular detail.

The reply algorithm of the present invention is based on trying to maintain a constant number of attempted replies. This constant is called the reply (attempt) rate and is measured in number of RF-IPPV modules per second. The reply rate is configurable. In order to maintain a constant reply rate, the number of RF-IPPV modules in a group must be limited. This constant will be referred to as the maximum number of modules in a group. The maximum number of modules in a group is configurable. Based on the maximum number of modules in a group, the number of groups in a cycle can be calculated as follows:

# of Groups = RF Module Population/Maximum in a group.

In a system in which group numbers are derived automatically from the digital address as discussed below, the number of groups is rounded up to the next power of 2.

The average number of RF modules in a group can be calculated as follows:

Avg. # in Group = RF Module Population/# of Groups.

This number is used to calculate the group length in seconds as follows:

Group Length = Avg. # in Group/Reply Rate.

The length of a cycle (in seconds) can then be calculated as follows:

Cycle Length = Group Length * (Number of Groups).

The number of cycles in a zone can be calculated as follows:

# of Cycles = (Zone end time − Zone Start Time)/Cycle Length.

If the calculated number of cycles is less than the minimum number of cycles allowed, the number of cycles is set to the minimum. The minimum zone length can then be calculated as follows:

Minimum Zone Length = # of Cycles * Cycle Length.

This number is compared against the zone length assigned by the user in the case of a cyclic auto-reply to determine whether the given zone length is long enough.

At the start of an auto-reply sequence, the above values are calculated. The system assigns a new zone number and a starting cycle number. The auto reply control sequence is then ready to begin. The system starts with the first group in this cycle of this zone and proceeds until the calculated number of groups in a cycle is reached. The cycle number is then incremented and a check is made to determine whether the total number of cycles for this zone has been exceeded (i.e. the end of the zone has been reached). If not, the group number will be reset and the sequence will continue.

While a group of RF-IPPV modules is replying, the system is receiving data and placing the data into its data base. After the data from an RF-IPPV module has been successfully placed in the data base, an acknowledgment is sent to the RF-IPPV module. Part of the data being forwarded from the RF-IPPV module to the system is a checksum of all the event data. This checksum is an acknowledgment code and is sent back to the RF-IPPV module in the acknowledgment message. If the acknowledgment code matches that originally sent with the event data, the data will be deleted from the RF-IPPV module memory. If the RF-IPPV module does not receive an acknowledgment message from the system during the current cycle, the RF-IPPV module will respond again during the next cycle of the present zone. If the RF-IPPV module receives an acknowledgment message during the current zone, the RF-IPPV module will not respond until the next zone. All RF-IPPV modules which have replied, regardless of whether any event data was sent with the data, will be sent an acknowledgment code. This will cause the number of collisions to decrease with each successive cycle in the zone.

The addressed auto-reply or poll is designed to retrieve IPPV data from a specific RF-IPPV module. The information sent to the RF-IPPV module is the same as in the global auto-reply with the following exceptions. The digital address of the RF-IPPV module being polled is included, the zone number is set to zero, and the rest of the information (Group, Cycle, Shift value, etc.) is set up so the RF-IPPV module will reply as quickly as possible even if there are no purchases to report.

In a current implementation, the group size is maintained between 2500 and 5000 set-top terminals. Set-tops are added to existing groups until each group has 5000 set-tops. When each group has 5000 set-tops, the number of groups is doubled in order that each group again has 2500 set-tops. For illustrative purposes, it will be assumed that a set-top population P initially consists of 3500 set-top terminals in a single group. As set-top terminals are added to the population P, the total population is compared with the upper limit of 5000. When the population consists of 5000 set-top terminals, the number of groups is doubled from one to two. Thus, the two groups each contain 2500 set-top terminals. As new set-top terminals are added to the population, the number of terminals in each of the two groups increases. When each of the two groups contains 5000 terminals, the number of groups is again doubled to yield a total of four groups, each of the four groups containing 2500 set-top terminals.

It has been empirically determined that the optimal attempt rate for the current RF IPPV return system is 50,000 attempts per hour. In order to maintain this attempt rate constant, the group time must vary as set-top terminals are added to the system. In the present implementation, to maintain the attempt rate constant, the group time length, or the time length during which each set-top in the group must attempt to transmit its data, must increase from 3 minutes to 6 minutes.

The above principles may be represented by a simple algorithm. This algorithm may be utilized when the groups are automatically set utilizing bits of the digital address of the set-top terminals. Assume initially, the number of groups G is equal to 1 and the total set-top terminal population is equal to N, then while $(G < 2)$ or $(P/G > 5000)$     1)

$G = 2 * G$ $S = P/G$     2)

$T = K * S$     3)

where S is equal to the number of converters per group, T is equal to the group time, and K is a constant chosen to maintain a constant attempt rate which, in the above example, is equal to 3 minutes per 2500 converters.

The group of which a particular converter is a member is determined by utilizing a particular number of bits of the converter address. For example if the number of groups is equal to eight, the last three bits of the converter address are utilized. If the number of groups is equal to sixteen, the last four bits of the set-top address are utilized.

At the beginning of a group time, the system manager downloads a transaction to the RF IPPV processor to indicate that a new group time is being initiated. The system manager then sends out a global command to the set-tops indicating that a new group time is being started and which group number is being polled. The set-top terminal includes a psuedo-random number generator. The psuedo-random number generator may comprise, for example, a free running timer or counter associated with each set-top. The psuedo-random number generator generates a plurality of start times corresponding to the number of attempts and the number of return frequencies. For example, if the set-top is instructed to make three attempts and the return path utilizes four frequencies, the psuedo-random number generator generates twelve random numbers. These random numbers are scaled to the group period.

Messages from the STT to the headend do not overlap. However, in a current implementation, rather than generating random numbers within a given group period which do not overlap, the module will wait until a given transmission is complete prior to initiating a second transmission even if, strictly speaking, the second transmission should have been initiated prior to termination of the first message. It will be apparent to those of ordinary skill that a set of non-overlapping random numbers may be generated and utilized to determine the transmission times and the invention should not be limited in this respect.

GROUPS

One method of having RF-STTs return data is to have the entire population transmit this data at some time during a predetermined callback period. However, this technique could potentially result in a reverse amplifier overload and generate undesirable effects in the forward path if the entire population attempted to transmit at the same time. Thus, it is preferable to divide the population into a plurality of groups. Nonetheless, a group equal to the entire RF-STT population may be utilized.

RF-STTs are assigned to groups by one of two methods. In cases where it is important that individual RF-STTs belong to a particular group (for example, if use of bridger switching is required), each RF-STT may be assigned to a specific group using an addressed group assignment transaction. A cable operator may desire to assign given set-top terminals to particular groups based on buy rates or other factors associated with a particular group or subset of the entire population. Other reasons may exist for cable operators to assign given members of a population to a given group and the present invention should not be limited in this respect. In this event, the number of groups is arbitrary within the range of 2 to 255. Also, group sizes may not be equal, and the group periods may need to be adjusted individually to allow for the different size groups. As it is an object of the present invention to eliminate bridger switching, it is more desirable if grouping assignments not be predetermined by the bridger switching network.

In the more common case, individual group assignment is not required. All RF-STTs are directed by a global transaction to use the least significant bits of the STT unique digital identifier (address) as the group number. The number of groups in this case is always a power of two (2, 4, 8, 16, etc.). Because the low order RF-STT address bit patterns are very evenly distributed in a large population of units, the number of STTs in each group is virtually identical and equal to the total number of RF-STTs divided by the number of groups. Two factors determine the actual number of groups.

The first factor is the optimal rate R at which STTs attempt to send messages to the RF-IPPV processor irrespective of the number of retries. The second factor is a convenient minimum group callback period $P_{min}$.

Then, the total RF-IPPV STT population may be divided into a maximum number of $2^n$ manageable sized groups by picking the largest value of n for which $$\frac{\# \text{ of } STTs}{2^n} >= R \times P\text{min}$$

The power of 2, n, determined by this equation is then the number of low order bits that each RF-STT must use to determine the group of which it is a member. For example, if n is determined to be four, then there are 16 total groups and each RF-STT would use the least significant four bits of its address as a group number.

ATTEMPT RATE

The optimal RF-STT attempt rate R used in the above equation is simply expressed as an average number of RF-STTs per unit time. However, each RF-STT has a configurable retry count, so the actual message attempt rate is equal to the number of RF-STTs in a group, times the number of transmissions (retries) that each unit makes, divided by the length of the group period. During a data return period, the average rate and length of message transmissions occurring determines the message density and therefore the probability of a collision occurring for any given transmission. Assuming that the average length of transmissions is relatively fixed, then the rate at which RF-STTs attempt to transmit return data is a primary influence affecting probability of collision, and conversely message throughput.

Low message attempt rates result in a lower probability of collision, while higher message attempt rates result in a correspondingly higher probability of collision for any given message. However, high success rates at low attempt rates (or low success rates at high attempt rates) can still result in a low overall throughput. Therefore, the measure of actual success rate is the probability of success for any message times the RF-STT attempt rate. For example, if 1000 RF-STTs attempt to return data in a one minute period, and the probability that any message will be involved in a collision is 20%, then the actual success rate is:

1000 RF-STTs × (100−20)%/MIN = 800 RF-STTS/MIN.

A numerically high RF-STT success rate is not the final measure of throughput in an RF-IPPV system unless it results in a near 100% success rate. Since the data returned represents revenue to the cable operator, all RF-STTs must return the data stored therein. Approaching a near 100% success rate may take two or more periods in a statistical data return approach. To continue the example, assume that a group has the above success rate during the first data return cycle. 800 RF-STTs per minute might be an extremely desirable throughput rate, but it is not acceptable to leave 20% of the group in a non-reporting state. During the next data return cycle, the 800 successful RF-STTs should have received data acknowledgements. As discussed above, RF-STTs that receive an acknowledgement corresponding to the exact data stored in secure memory do not respond again until a new zone begins. Therefore only the 200 RF-STTs that were unsuccessful in the first cycle should attempt to return data. This results in a much lower probability of collision during the second cycle. For illustrative purposes, it will be assumed the probability that any message will be involved in a collision is 1%. During this one minute period, 200×(100−1)% = 198 RF-STTs are successful. Combining the two cycles, there is an effective success rate of:

800 + 198 *RF-STTs*/2 MIN or 499 *RF-STTS*/MIN

This rate is achieved with nearly 100% of the RF-STTs reporting and is therefore a very good measure of the real system throughput. The "optimal" attempt rate is thus defined as that attempt rate which yields substantially 100% effective success rate for a given number of RF-STTs in the least amount of time.

The present invention has used a simulation technique based on a model of the RF-IPPV data return system to determine optimal attempt rates. However, it should be noted that while choosing an optimal attempt rate affects the performance of the system, it is not critical to the operation of the present invention.

The description and calculations detailed above assume that data return is achieved for returning IPPV event data from IPPV modules. However, the RF return system of the present invention may be applied broadly to systems in which a plurality of remote units or terminals attempt to transfer stored data to a central location. Requirements for burglar alarm, energy management, home shopping and other services are generally additive to IPPV service requirements. Some efficiencies in scale, however, may be achieved by combining data return for certain of these additional services into transactions for IPPV service although different addressable or global commands and responses may be appropriate for different transactions, especially real time requirements such as the delivery of two-way voice (telephone) communications.

RF-IPPV MODULE TRANSMITTER LEVEL ADJUSTMENT

For a number of reasons, including S/N ratio and adjacent channel interference requirements, it is necessary that the RF-IPPV transmitter (FIG. 6) data carrier output levels be set to near optimum for the reverse channel. Furthermore, for low installation cost, ease of maintenance, repeatability and reliability, it is very desirable that the adjustment of the output level be as automatic as possible.

For the purposes of this discussion an "optimum" transmitter output is defined to be such that the level that appears at the first reverse trunk amplifier is K dBmV, where K is a constant (typically +12 dBmV) that depends primarily upon the cable system and reverse trunk amplifier characteristics.

Fortunately, the primary sources of variable loss between the transmitter and data receiver occur in the drop from the module to the cable tap plus the cable segment to the first reverse amplifier. The remainder of the reverse path that the transmitted signal encounters, from the first reverse amplifier to the receiver, is typically designed to have unity gain. This makes it possible to measure the signal level at the receiver and make the assumption that it is essentially the level present at the first reverse amplifier of FIG. 1 from the subscriber location.

The paragraphs below describe both a procedure and required equipment functionality for performing Automatic Transmitter Calibration (ATC) in the RF-IPPV system of FIG. 3.

RF-IPPV CALIBRATION

Three types of Automatic Transmitter Calibration (ATC) replies may be sent by a settop terminal. The first of these indicates a request for calibration. This reply is immediately forwarded on to the System Manager. A second reply is the eight-step ATC reply. The eight-step ATC Reply is comprised of eight ATC Reply messages of predetermined length transmitted at successively increasing power levels. This provides a means for the RF Processor to determine the appropriate transmitter output level of the terminal. The ideal level gives an input to the RF Processor which is as close as possible to a nominal input level (typically +12 dBmV). Each eight-step ATC Reply is followed by a steady state calibration signal which is measured by the RF Processor. The third type of ATC Reply is the one-step ATC Reply. It consists of a single ATC Reply followed by a steady state calibration signal and is normally used to verify the proper setting of the terminal transmitter level.

The ATC sequence begins when the RF Processor receives a valid ATC Reply from the set-top terminal. The ATC Reply indicates which set-top terminal is transmitting by way of it's address and at which transmitter output level (0-14) it is transmitting at. Immediately following the ATC Reply, the set-top terminal will transmit a continuous square wave at the indicated transmitter output level. This square wave will continue for a programmable period of time.

After a programmable Holdoff Period (0-102 milliseconds), the RF Processor will begin an analog measurement of this square wave for a programmable Measurement Period (1-400 milliseconds). During the measurement period, the RF processor will monitor the square wave for missing or out-of-place transitions. If the erroneous transitions exceed a programmable threshold, the measurement will be given a rating of DON'T KNOW. This provides protection against unexpected noise or signal sources that add enough energy to the line to interfere with an accurate measurement. It also provides an indication that the calibration signal (the square wave) is at too low of a level for an accurate measurement.

At manufacture and at periodic maintenance intervals, each RF processor is calibrated at the three reference levels by which the received signal is evaluated. These are referred to as the HIGH, NOMINAL, or LOW levels. These are programmable by way of the calibration procedure. In general, the HIGH refers to +3 dB above the NOMINAL level; the LOW refers to −3 dB below NOMINAL; and NOMINAL refers to the ideal input level (typically +12 dBmV).

The ATC sequence is designed so that each terminal will transmit at a level that is as close as possible to the NOMINAL level. Each ATC calibration signal is evaluated and given a rating of HIGH which means that the signal is above the HIGH level; a rating of LOW which means that the signal was below the LOW level; a rating of OK meaning its signal was between the HIGH and LOW level; or a rating of DON'T KNOW meaning that the calibration signal was invalid.

During an eight-step ATC sequence, the settop terminal will transmit eight difference ATC Replies. The first step will be transmitted at a level 0, the second at level 2, and so on until level 14 has been transmitted. These eight levels are automatically transmitted in rapid succession on a reserved frequency. The evaluation algorithm is outlined as follows:

1) If the number of bad transitions indicated with this measurement exceed the acceptable limit, give it an ATC Rating of DON'T KNOW and skip steps 2, 3 and 4.
2) If the measured level of the ATC signal is closer to OK than the current Best ATC level, then save this as the Best ATC level.
3) If this is not the first step received nor was the last step missed then:
   a) Measure the time between this step and the last step and save for timeout calculations.
   b) If the interpolated level of the previous odd ATC Level is closer to OK than the current Best ATC Level, then save the interpolated level as the Best ATC level.
   c) If the extrapolated level of the next odd ATC Level is closer to OK than the current Best ATC Level, then save the extrapolated level as the Best ATC Level.
4) Evaluate the current Best ATC Level as HIGH, OK or LOW.
5) If this is a one-step ATC or the last step of an eight-step ATC or a timeout has occurred, then forward this ATC evaluation to the System Manager; otherwise, start a timer based on the time between steps and the current ATC level.

In addition to the Automatic Transmitter Calibration sequence, all other terminal replies including IPPV event data and other messages will also be evaluated for signal level. This is referred to as the Received Signal Strength Indicator (RSSI). This measurement does not have the accuracy of normal ATC measurements, but will provide an adequate gauge of the signal level. In this case, the measurement sequence begins shortly after the reception of a valid terminal reply as defined by the Holdoff Period and will continue until either the Measurement Period expires or until the end of the reply. The resulting measurement will be evaluated for signal level. When the reply is forwarded to the System Manager, the RSSI evaluation will be forwarded also.

Each RF Processor Receiver (of four such receivers) is set with two levels by which the terminal reply may be evaluated. The two levels, HIGH and LOW are typically set to −4 dB and +4 dB from the nominal level. However, the HIGH and LOW levels may be set individually and tailored to the cable system. Each reply is evaluated and given a rating of HIGH which means that the signal is above the HIGH level; a rating of LOW which means that the signal is below the LOW level; a rating of OK meaning its signal is between the HIGH and LOW level; or a rating of DON'T KNOW meaning that the measurement period exceeds the duration of the reply.

In addition to the RSSI evaluation given to each terminal reply, the average RSSI of all replies received during a Group Period is evaluated on a per receiver basis. This provides a more generalized evaluation of the replies coming in on each of the four receivers.

This average RSSI evaluation may also be forwarded to System Manager. This provides an important feedback tool for the technical evaluation of appropriateness of selected frequencies or of the reverse cable system operation.

AUTOMATIC TRANSMITTER CALIBRATION PROCEDURE

1. Prior to initiating the automatic transmitter calibration (ATC) procedure, the system manager sends a setup command to the RF-IPPV processor to provide it with appropriate frequencies and calibration parameters. In addition, the system manager sends a Category 1 RF-IPPV frequencies and levels message and a Category 2 frequencies and levels message to all set top terminals or modules.
2. A system operator selects a set-top terminal or module to be calibrated (if any) or the system manager determines a set-top terminal to be recalibrated or one which is new to the system and has requested calibration.
3. The system manager generates a calibration request and places it on a request queue for the selected set-top terminal.
4. When the system manager determines that ATC be initiated, it removes the calibration request from the request queue and sends and addressed RF-IPPV calibration parameters transaction instructing the set-top terminal or module to perform an eight step calibration sequence between itself and the RF-IPPV processor.
5. The system manager polls the RF-IPPV processor to obtain the desired transmit level which is determined preferably by the RF-IPPV processor from the 8 step calibration sequence (although, in an alternative embodiment, the system manager may make the determination having been transmitted data by the RF-IPPV processor).
6. The system manager sends an addressed RF-IPPV calibration parameters transaction directing the set-top terminal or module to transmit at the desired transmit level received in step 5. This is done to verify the correctness of the desired transmit level.
7. The system manager polls the RF-IPPV processor for the results of the verification performed in step 6.
8. The system manager sends an addressed RF-IPPV calibration parameters transaction directing the set-top terminal or module to store the desired level in its NVM.
9. The system manager polls the RF-IPPV processor for the results of the final RF-IPPV calibration parameters transaction and then updates the calibration status for the set-top terminal or module.
10. If any of the results from the RF-IPPV processor polls are unsatisfactory, the system manager may repeat the ATC calibration procedure. Otherwise, go to step 2.

CALIBRATION STATUS FROM THE PERSPECTIVE OF THE RF PROCESSOR

Firstly, the terminal calibration status for each received terminal address is checked. For each digital set-top terminal address, the RF processor send a LEVEL RATING. This level rating is a rough indication of the integrity of the calibration. The possible values of the level rating are "High", "Low", "OK", and "Don't Know". The system manager keeps track of the number of abnormal (i.e., non-OK) level ratings received from a particular digital address. Whenever the counter is incremented past a certain threshold, the calibration status is changed to "NEEDS CAL". This threshold is the RSSI LEVEL RATING COUNTER. The default value for this threshold is preferably 12 and can be programmed from 1 to 12. The RSSI Level Rating Counter can be changed by using an IPPV utility program as necessary. The system manager can also be configured to increment only on a High level rating, only on a low level rating, or on either a "high" or "low" rating. The default setting is to increment on either a level rating of "high" or "low". A level rating of "Don't Know" is ignored by the RF processor. Flags which configure the increment instructions can also be changed using the IPPV utility program. In addition, the system manager can be configured to decrement the counter whenever an OK level rating is received. This feature is turned off in the default configuration of the system manager, but it can be turned on using the IPPV utility program. When this feature is enabled if the status is "Needs Cal" and the counter reaches zero, the calibration status is reset to "Calibrated".

RF-IPPV PROCESSOR AND SYSTEM MANAGER COMMUNICATION

The RF-IPPV Processor communicates with the system manager over an RS-232 full-duplex serial communications link in a half-duplex transmission format (only one direction at a time). Any appropriate communications format may be employed but preferably may be synchronous at 9600 Baud. This link may optionally be connected through an appropriate modem if the units are remote from one another. All transmitted data is preferably secured by a checksum.

All system manager to RF-IPPV receiver commands include an acknowledgment (ACK or NAK) of the prior receiver to system manager transmission. If the receiver receives an ACK, then it flushes its reply buffer and reads the new command and loads the new reply into its reply buffer. If it receives a NAK, then one of two actions are taken depending on whether a valid command has already been received. If a valid command has already been received, then the previously loaded reply will simply be retransmitted regardless of what the new command might be. However, if a valid command has not been received (and therefore no reply in the reply buffer), then the new command will be read and the reply buffer will be loaded. In practical terms, when the system manager detects a bad checksum or a timeout, it should retransmit the same command with a NAK. All transmissions between the system manager and receiver are preferably terminated with an end of transmission indication.

Multi-byte data items are transmitted MSB first and LSB last with the following exceptions-data from the STT event and memory replies are forwarded unaltered. This includes the terminal (or module's) 2-byte checksum. Additionally, the status reply, which represents a memory image of important receiver parameters and data, is also transmitted unaltered. In this case, multi-bytes parameters are sent LSB first and MSB last. (This is the Intel standard format).

The system manager/receiver checksum (for example, a 16 bit checksum) is generated by adding each transmitted or received character to the LSB of the checksum. There is no carry into the MSB of the checksum. The result is then rotated left by 1 bit. The checksum initially is set to 0. Each character in the message up to, but not including, the checksum is included in the checksum. The resulting checksum is converted and encoded and transmitted with the other data.

System manager to receiver transactions include the following:

1) SETUP COMMAND—This command defines the 4 frequencies that will be used with each of the 2 categories. A frequency value of −1 will disable use of the corresponding receiver module. Calibration parameters are also set with this command. The AUTOMATIC TRANSMITTER CALIBRATION REPLY, MEMORY REQUEST REPLY or EVENT-/VIEWING STATISTICS REPLY PACKET will be sent in response to this command.
2) INITIALIZE NEW GROUP—This command is issued to the receiver whenever an RF-IPPV GLOBAL CALLBACK is issued to the terminals. It informs the receiver which frequencies to tune to. It also clears the duplicate check list. The GROUP STATISTICS REPLY is sent in response to this command.
3) ENQUIRY COMMAND—The Enquiry Command requests the receiver to send whatever reply is queued to be sent. This reply will be the AUTOMATIC TRANSMITTER CALIBRATION REPLY, MEMORY REQUEST REPLY or EVENT-/VIEWING STATISTICS REPLY PACKET. If no data is queued to be sent, then an empty EVENT-/VIEWING STATISTICS REPLY PACKET will be sent.
4) STATUS REQUEST COMMAND—The Status Request Command requests the receiver to send a dump of its current status and parameter settings. Its use is intended as a diagnostic and debug tool.

Receiver to system manager transactions include the following:
1) AUTOMATIC TRANSMITTER CALIBRATION REPLY—The ATC Reply is transmitted to the system manager whenever a complete calibration message is received from a terminal or module. It provides a qualitative rating of the received signal level and the corresponding attenuation level that was used by the terminal or module.
2) GROUP STATISTICS REPLY—This is transmitted in response to an INITIALIZE NEW GROUP command. It provides the group statistics accumulated since the last time an INITIALIZE NEW GROUP was issued.
3) EVENT/VIEWING STATISTICS REPLY PACKET—During a group period (the time from one New Group command to the next), the receiver queues event/viewing statistics from the terminals or modules. The reply packet provides for the transmission of multiple event/viewing statistics in a single transmission format. If there is no data to be sent, then an empty reply packet will be sent.
4) MEMORY REQUEST REPLY—This is a terminals module memory dump of set-top terminal memory.
5) STATUS REQUEST REPLY—This is transmitted in response to a STATUS REQUEST COMMAND.

These commands are further described as follows. The Setup Command must be issued by the system manager to the receiver before any New Group commands are issued. This command informs the receiver which frequencies to tune each of its receiver modules to. Two categories of frequencies may be set with each category providing four unique frequencies. A typical use of the two categories would provide a set of four frequencies to use during the day and another set of four frequencies to use at night. The choice of frequencies would be made during startup and re-evaluated on a periodic basis.

The Setup Command should be sent when the Setup Request of the Receiver Status is sent. The Setup Request status bit will be cleared when a valid Setup Command has been received. If Module D (and channel D) has a valid frequency, then it will be used as the SSA (Signal Strength Analyzer) frequency. If Module D's frequency is set to 0, then the Setup Command parameter 'SSA Frequency' will be used.

The Initialize New Group command is used to mark the beginning of a group callback period. Statistics from the previous Group Period will be forwarded to the system manager (see Group Statistics Reply). The statistics associated with the previous Group Period will be erased.

The RF receiver will begin collecting Event/Viewing Statistics replies from the terminal or module when the receiver receives the Initialize New Group command from the system manager. Throughout the period of a Group Callback, as many as 16 duplicate messages can come in from a single terminal or module. However, only one of these duplicates will be forwarded to the system manager. All others will be discarded.

The Enquiry Command requests the receiver to send whatever data is ready to be sent to the system manager. This reply will be the AUTOMATIC TRANSMITTER CALIBRATION REPLY, MEMORY REQUEST REPLY or EVENT/VIEWING STATISTICS REPLY PACKET.

The Status Request Command requests the receiver to send a snapshot of its current status. This includes all parameter settings, software revision numbers, status of the receive queue and other pertinent status variables.

The Event/Viewing Statistics Reply from the terminal or module can be received at any time by the receiver. Typically, the collection of this data begins when the RF receiver has been issued a New Group Command and the terminals or modules have been issued a Global Group Callback. During the Group Callback period, the terminal or module will transmit its Event/Viewing Statistics as many as fifteen times on the four different data return frequencies. These 16 or less identical transmissions will be filtered by the receiver and only one of these will be passed on to the system manager.

The receiver will automatically discard any messages that do not have a valid checksum or whose length byte does not match the received byte count. The receiver will keep a record of all unique Event/Viewing Statistics replies that it receives during the Group Period. This is called the Received List. The Received List consists of each unique terminal/module address that was received. When a reply comes in from a terminal, it will be checked against the Received List. If a matching teminal address is found, then the duplicate will be discarded. If the terminal address is not found, then the address of that terminal is added to the list. In this manner, redundant messages are filtered or hashed out prior to transmission to the system manager. The Received List will be purged when the next Initialize New Group command is received. This list is large enough to accommodate the largest number of terminals that can reply during a Group Period.

If an Event/Viewing Statistics reply passes the validity test and is not a duplicate message, it will be placed in a queue of messages to be transmitted to the system manager (called the Message Queue). The Message Queue is large enough to accommodate the largest number of terminals in a group if each were to transmit one event. The valid messages are formed into packets for transmission to the system manager. A secondary buffer, called the Packet Buffer is sized to accommodate the maximum number of bytes that can be transmitted to the system manager (approximately 2000 bytes). Messages will be transferred from the Message Queue to the Packet Buffer if room is available.

Messages will be removed from the receiver memory after the transmission is acknowledged with an ACK from the system manager. The receiver will transmit Event/Viewing Statistics Packets to the system manager shortly after messages begin to come in and will continue to do so until they are all transmitted. Messages remaining in the Message Queue will continue to be transmitted to the system manager until the Queue is empty.

Figure 14:
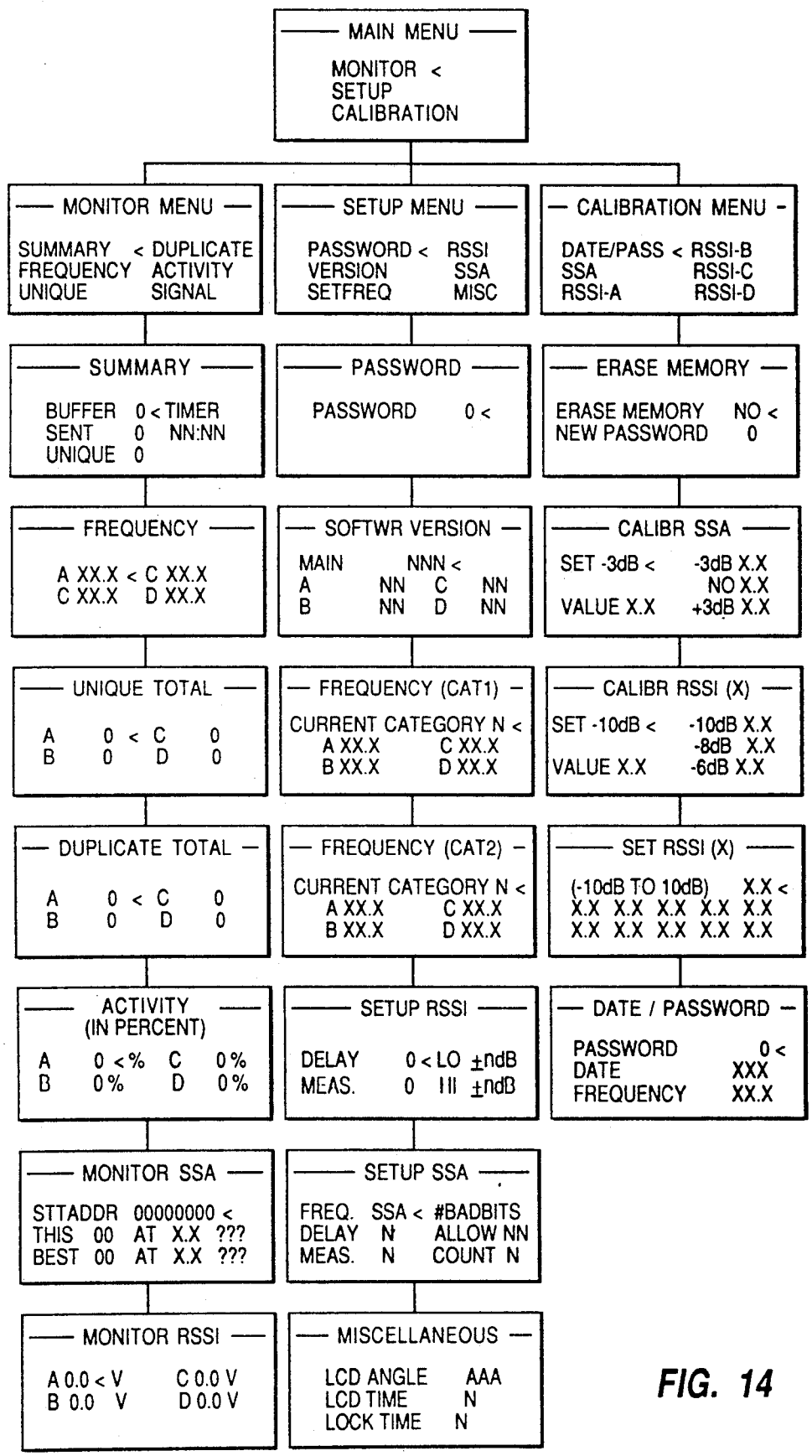
FIG. 14 is a diagram of a tree structure of screens which may be displayed by manipulating keys of a keyboard of the RF IPPV processor's keyboard.

During the Group Period, the receiver will keep statistics of line activity. This is the purpose of the Group Statistics Reply. The intent is to provide operator feedback of both the appropriateness of the chosen group parameters and of the fitness of the chosen frequencies. Because the terminal or module transmits identical information on each of the available frequencies, line activity statistics will show when one or more of the selected frequencies should be changed to another. The receiver keeps count of valid replies received on each frequency. This count includes duplicates. The receiver also keeps a count of the number of valid bytes received on each frequency. This provides basically the same information as the message count but takes into account the varying length of messages. At the end of a group period, the byte count is divided by the message count, and thereby gives an average number of bytes per message. Thus, generally speaking, the group statistics data provides an accurate reading on the successful data throughput on each channel and each transmitter. Responsive to this indication the system manager can automatically change channel frequency on a periodic basis as required by poor throughput. In an alternative embodiment, bit error rate or other parameters indicating poor data throughput may be accumulated to signal a change to a new frequency. These various parameters may be viewed at the RF IPPV processor (receiver) on a four line, twenty character per line display. Referring briefly to FIG. 14, a menu-driven tree structure of screens is shown for displaying the functions of monitoring, setup and calibration.

The group statistics are transmitted to the system manager when an Initialize New Group Command is issued. All statistics are cleared from memory at this point. The statistics transmitted to the system manager include:
1) Total number of valid replies received on each of the four frequencies of a category during the last group period.
2) Average length in bytes of the replies on each of the four frequencies of a category during the last group period.
3) Total number of unique replies during the last group period (this is the same as the number of entries in the Received List).

If the system manager begins a phase where only Addressed Callback commands are issued to the terminals/modules, it should start the phase by an Initialize New Group command. While this is not critical, it will clear out the statistics from the previous Group Callback.

During terminal installation and at other maintenance periods, the output transmitter level of each terminal/module must be adjusted so that the received level at the receiver is within acceptable limits. This is the purpose of the ATC Evaluation Reply. The calibration process begins when the system manager requests the terminal/module to transmit a sequence of calibration reply messages at predetermined attenuation levels. The terminal will transmit the calibration reply messages each of which includes the terminal address and the trial transmit level, immediately followed by the calibration signal. The receiver will make a measurement of the signal by comparison with an expected level and save the evaluation for the next signal level. The terminal will then step to the next level and again transmit a Calibration Reply/Calibration Signal. This will continue until the complete sequence of calibration reply messages have been transmitted (maximum of 8). When the last calibration reply message is received or a timeout occurs, the sequence will be presumed complete and the ATC Evaluation Reply will be forwarded on to the system manager.

The calibration measurement is performed by a combination of the Signal Strength Analyzer (SSA) and the selected RF Receiver Module, for example, D. Receiver Module D must be set to the calibration frequency. Module D's frequency is determined as follows:
1) Set to current Group frequency for Module D if that frequency is set to a valid frequency number.
2) Set to the SSA Calibration frequency if current Group frequency for Module D is 0.
3) Disabled if current Group frequency for Module D is −1 or more than the maximum frequency number.

The calibration measurement sequence begins when the receiver receives a valid Calibration Reply from the terminal. As soon as the end of message is detected (Miller encoding stopped or interrupted), a Holdoff Period will begin. When this has expired, the measurement process will begin and will continue for the duration of the Measurement Period. Holdoff Period and Measurement Period are specified either by the Setup Command or from the front panel of the RF receiver. The final signal level reading represents an average of all the samples.

STT/RF-IPPV MODULE OPERATION

This section describes the operation between an STT and an RF-IPPV Module. The particular sequence of operations discussed herein describes a Scientific Atlanta Model 8580 Set-top. On power-up, both the set-top terminal and the RF-IPPV Module perform a sequence of operations to determine the particular configuration and authorization level of the STT. For example, upon power up and when the RF IPPV module is connected to the set-top terminal, terminal channel authorization data is automatically updated to include (or authorize) all pay-per-view channels. In other words, simply the connection of the module with the set-top terminal may be sufficient for IPPV service authorization. Also, a bit is set in memory indicating that RF return (rather than phone or other return) is being implemented. The module then performs a Power-up Initiated Calibration Auto-Reply Transmission (hereinafter referred to as a PICART) if the module has not been calibrated to set the transmitter data carrier output levels to near optimum for the reverse channel.

Following the power-up reset sequence, the RF-IPPV Module begins normal background processing. Background processing generally consists of checking the current time against stored viewing channel record times and checking for Manually Initiated Calibration Auto-Reply Transmission (hereinafter referred to as MICART) requests from the STT keyboard. Background processing in the module is driven by a predetermined first operation code (opcode) having a predetermined frequency from the STT to the module.

Upon power-up, the STT reads the STT non-volatile memories and copies channel authorization, level of service, tuning algorithm constants, and the like to RAM. The RF-IPPV Module reads the RF-IPPV non-volatile memories and copies group number, transmit levels, active event channels, purchased event count, and the like to RAM. The module then sets up to determined STT type on receipt of the next opcode from the STT.

Upon receipt of the opcode, the RF-IPPV Module requests one byte of data from an STT memory location to determine STT type. For example, the RF-IPPV Module would receive data indicating a Scientific Atlanta 8580, Phase 6 type set-top terminal. This feature allows the RF IPPV module to be compatible with a plurality of STTs. The RF-IPPV Module then sets up to read the STT address upon receipt of the next opcode.

Upon receipt of the opcode, the RF-IPPV Module then requests four bytes of data from the STT memory and saves the data returned as the STT address. The RF-IPPV Module then sets up to read the STT authorized channel map (i.e., those channels which the STT is authorized to receive) upon receipt of the next opcode.

Upon receipt of the opcode, the RF-IPPV Module requests sixteen bytes of data from the STT memory and calculates the first part of an STT checksum. The RF-IPPV Module then sets up to read the STT features flags upon receipt of the next opcode.

Upon receipt of the opcode, the RF-IPPV Module requests one byte of data from the STT memory and completes the STT checksum calculation. The RF-IPPV Module then sets up to determine if a data carrier is present upon receipt of the next opcode.

Until a data carrier present or until a predetermined period of time after power-up, the STT sends opcodes to the RF-IPPV Module. RF-IPPV Module then requests one byte of data from the STT memory and determines whether the data carrier present flag is set. If a data carrier is present, the RF-IPPV Module then reads the non-volatile memory and determines if the module is calibrated. If the module is calibrated, then the RF-IPPV Module simply sets up to read the time upon receipt of the next opcode. If the module is not calibrated, the RF IPPV module sets up to execute a PICART. In either case, the RF-IPPV Module sets up to read the time upon receipt of the next opcode.

If a data carrier is not present, the RF-IPPV Module continues to check on a predetermined number of succeeding opcodes (corresponding to the predetermined period of time) until a data carrier is present. If, after the predetermined number of tries no data carrier is present, the RF-IPPV Module sets up to read the time on receipt of the next opcode and begins normal background processing, i.e., PICART is aborted.

After a data carrier is detected, normal background processing begins. The STT sends an opcode to the RF-IPPV Module. The RF-IPPV Module requests four bytes of data from the STT memory and checks if the current time matches any viewing statistics record times stored in non-volatile memory. The viewing statistics feature will be explained in greater detail below. The RF-IPPV Module then sets up to read the STT mode on receipt of the next opcode. If a match between the current time and the record time is found, the STT mode is read to determine whether the STT is on or off so the correct viewing channel number may be recorded. If a match between the current time and the record time is not found, the STT mode is read to determine whether the STT is in diagnostics mode and whether MICART has been requested. The step described by this paragraph will be referred to as step G1.

If a time match is found, the STT sends an opcode to the RF-IPPV Module. The RF-IPPV module requests one byte of data from the STT memory and checks whether the STT is off or on. If the STT is off, the RF-IPPV Module stores a predetermined character or characters in non-volatile memory as the current viewing channel. RF-IPPV Module then sets up to read the time on receipt of the next opcode and repeats step G1 above. If the STT is on, the RF-IPPV Module sets up to read the current channel tuned on receipt of the next opcode.

If a time match is found and the STT is on, the STT sends the opcode to the RF-IPPV Module. The RF-IPPV Module requests one byte of data from the STT memory and stores that value in non-volatile memory as the current viewing channel. The RF-IPPV Module sets up to read the time on receipt of the next opcode and repeats step G1.

If there is no time match, the STT sends the opcode to the RF-IPPV Module. The RF-IPPV Module requests one byte of data from the STT memory and determines whether the STT is in diagnostics mode. If the STT is not in diagnostics mode, the RF-IPPV Module sets up to read the time on receipt of the next opcode and repeats step G1 above. If the STT is in diagnostics mode, the RF-IPPV Module sets up to read the last key pressed on receipt of the next opcode.

If the STT is in diagnostics mode, the STT sends the opcode to the RF-IPPV Module. The RF-IPPV Module requests one byte of data from the STT memory and checks if the proper key sequence was last pressed. If so, then the module begins a MICART. If not, the module does nothing. In either case, the RF-IPPV Module then sets up to read the current time on receipt of the next opcode and repeats step G1.

While this sequence has been described in detail for a Scientific Atlanta Model 8580 set-top terminal, the sequence for other set-top terminals, including those for in-band systems, is similar and will not be discussed here in detail.

This next section relates to IPPV event authorization, purchase, and deauthorization. Unlike background processing which is based on the receipt of an opcode having the predetermined frequency from the STT, IPPV event operations may occur at any time during the normal operation of the RF-IPPV Module. The STT may receive (and transfer to the RF-IPPV Module) transactions which authorize or deauthorize an event anytime. Likewise, a subscriber may decide to purchase an event at anytime. In this sense, IPPV operations are essentially interrupts to the normal background processing of the RF-IPPV Module.

In both out-of-band and in-band systems, transactions from the headend control event authorization and deauthorization. To deauthorize an event, the STT must receive an IPPV Event Data transaction twice. This is because the RF-IPPV Module (not the STT) actually determines when an event is over from the transactions, and only has the opportunity to inform the STT (via the channel map update request) on succeeding transfers of transactions from the STT.

The basic difference between out-of-band and in-band operation is that out-of-band STTs may receive data transactions at any time and in-band STTs may only receive transactions on channels with data. Thus, as above, the sequence below will be described in detail for an out-of-band Scientific Atlanta 8580 set-top terminal.

For proper handling of IPPV operations, the headend must send an IPPV Event Data outband transaction referred to below as an IPPV Event Data transaction at no more than a predetermined frequency such as once a second.

First, the purchase of an event when the subscriber accesses an IPPV channel either by direct digit entry or utilizing the increment/decrement switches on the set-top or an infrared remote will be described. The STT tunes the IPPV channel and waits for the outband transaction.

When the STT receives the outband transaction, the STT sends the entire transaction to the RF-IPPV Module using a second opcode and determines whether the RF-IPPV Module requests a channel map update. The STT then tunes the barker channel if no free time is available or tunes the IPPV channel if free time is available. The STT does BUY alert if the purchase window is open and if the channel is not currently authorized in the STT RAM, i.e., not already bought.

When the RF IPPV module receives the outband transaction via the opcode, the RF-IPPV Module does not request a channel map update upon receipt of the second opcode. The RF-IPPV Module at this time performs an authorization check which entails checking if the channel specified is active and, if so, if the event is over (event IDs different). If the event is over, the module queues a channel map update request for the next opcode, clears the active event bit for the specified channel in non-volatile memory and preformats NVM data for future transmission. The procedure described in this paragraph will be referred to as step C.

If the subscriber buys the event, after the first depression of the "BUY" key, the STT sends a command to determine if the RF-IPPV non-volatile memory is full. The RF-IPPV Module responds with either the total number of events stored or a predetermined value if the non-volatile memory is full. If the NVM is full, the STT displays "FUL" on the set-top terminal display. If the RF-IPPV NVM is not full, the STT queues an outband purchase command for the next opcode after the second "BUY" press.

When the STT receives the outband transaction, the STT sends the entire transaction to the RF-IPPV Module using the second opcode and checks if the RF-IPPV Module requests a channel map update. The RF-IPPV Module then performs another authorization check as described in Step C. The STT then sends an event purchase command to the RF-IPPV Module and receives ACK/NAK (Acknowledge/Nonacknowledge) from the module. In addition to the channel number, this includes the event purchase time. The STT then tunes the barker channel if NAK or tunes the IPPV channel if ACK.

When the RF-IPPV module receives the event purchase opcode from the STT, the RF-IPPV Module checks if the NVM is full or if NVM/PLL tampering has been detected. If so, the module returns a NAK. Otherwise the module is able to purchase the event and returns ACK to the STT.

When the event is purchased, the RF-IPPV Module stores the channel number, event ID (from the outband transaction), and purchase time in the NVM and sets the event active flag for that event.

If the STT receives an outband transaction having a different event ID, the STT sends the entire transaction to the RF-IPPV Module using the Opcode and checks if the RF-IPPV Module requests a channel map update. The RF-IPPV Module does not request channel map update on this transaction. The module does identify and deauthorize the event and preformats the event data for future transmission in the RF-IPPV NVM. The module queues channel map update request for next opcode.

The above set-top terminals also support VCR IPPV event purchase. This is very similar to the normal IPPV event purchase and will not be discussed in detail here. The primary difference is that the subscriber prebuys the event, causing the RF-IPPV Module to reserve space in NVM for the event. This space is not used until the event begins, but is counted to determine if the NVM is full on subsequent purchase attempts.

The RF-IPPV Module of the present invention includes three different types of reply data: Event/Viewing Statistics, Memory Dump, and Calibration. The first two replies have certain features in common, namely the security data returned to the headend. All three replies include the STT digital address.

The Event/Viewing Statistics reply includes information related to the number of bytes in the message, the type of message (i.e. event/viewing statistics), the STT digital address, the recording times and channels which were tuned by the STTs at those recording times, and IPPV purchase data such as event ID and purchase time.

The Memory Dump reply includes information related to the number of bytes in the message, the callback type (i.e. memory request), the STT digital address, and the information from the memory locations desired.

The Calibration reply includes information related to the number of bytes in the message, the callback type (i.e. calibration reply), the STT digital address, and the transmit level followed by a calibration waveform for signal strength measurement

MILLER DATA ENCODING

The RF-IPPV Module transmits data using Miller data encoding.

Figure 15:
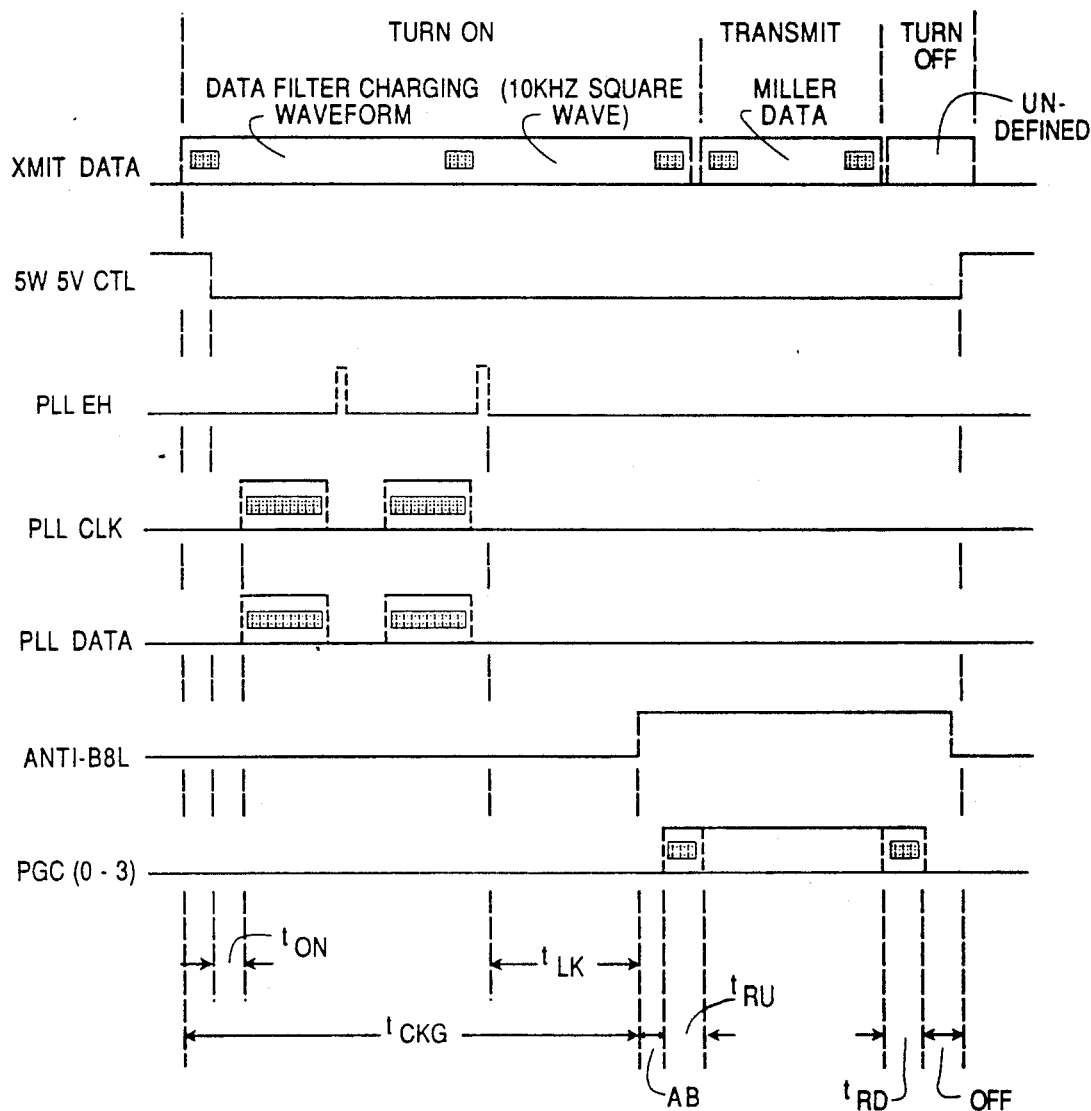
FIG. 15 is a timing diagram of an RF-IPPV data transmission sequence.

Miller encoding, also known as delay modulation, transmits a "1" with a signal transition in the middle of the bit interval. A "0" has no transition unless it is followed by another "0" in which case the transition occurs at the end of the bit interval. FIG. 15 illustrates Miller data encoding.

DATA TRANSMISSION SEQUENCE

For each data transmission, the RF-IPPV performs the following sequence:

A. Begin toggling transmitted data line at 10 kHz rate. This is to charge up the data filter.

B. Set gain to minimum.
C. Turn on the switched +5 V to the RF circuitry.
D. Delay approximately 1 ms for switched 5 V to settle.
E. Set correct PLL frequency (read from NVM).
F. Delay approximately 20 ms for the PLL to lock.
G. Key-down the anti-babble circuit.
H. Delay approximately 1 ms for the final output stage to settle.
I. Ramp up to correct gain (read from NVM).
J. Transmit the data.

When data transmission is complete, the RF-IPPV module performs the following sequence:
A. Generate Miller error in transmitted data to end transmission (for receiver).
B. Ramp gain down to minimum.
C. Key-up anti-babble circuit.
D. Delay approximately 1 ms to avoid chirping.
E. Turn off switched +5 V.

Figure 16:
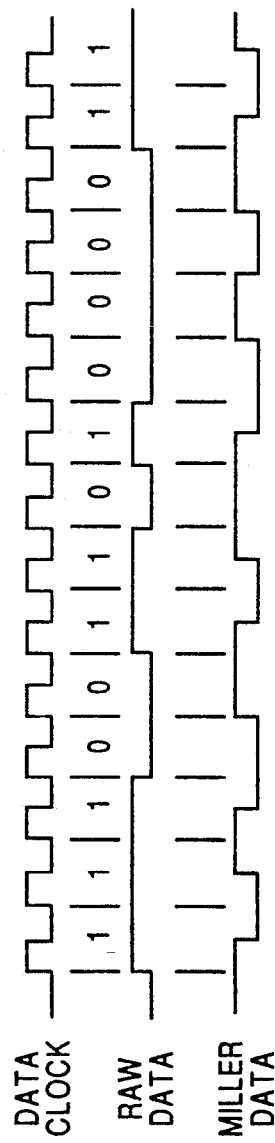
FIG. 16 is a data waveform diagram for demonstrating the principles of Miller encoding.

These sequences are detailed in FIG. 16 using the following definitions:

| | |
|---|---|
| Switched 5 V on to PLL Data In | $t_{on}$ |
| PLL Lock Delay | $t_{LK}$ |
| Data Filter Charge Time | $t_{CHG}$ |
| Anti-Babble Key-Down to PGC Ramp Up | $t_{AB}$ |
| PGC Ramp Up | $t_{RU}$ |
| PGC Ramp Down | $t_{RD}$ |
| PGC Ramp Down to Switched 5 V Off | $t_{OFF}$ |

One embodiment of the present invention permits the system manager to retrieve viewer statistics regarding the channels to which a particular subscriber is tuned at predetermined times during a time period. In a present implementation, the system manager generates a global transaction which defines four times at which an RF-IPPV module should record in NVM 503 (FIG. 5) the channel to which its set-top terminal is tuned. These times may be within any convenient time period such as a day, a week, a bi-week, and the like. For illustrative purposes, it will be assumed that the system manager instructs the RF-IPPV module to record the tuned set-top terminal channel on Sunday at 7:00 PM, Tuesday at 9:00 PM, Thursday at 8:00 PM, and Thursday at 10:00 PM in a one week time period. When the current time matches one of these four times, the module records the channel tuned by the set-top in NVM 503. As discussed above, the viewing statistics information is included in an Event/Viewing Statistics Reply. This reply includes information related to the number of bytes in the message, the type of message, the STT digital address, the recording times and channels which were tuned by the STTs at those recording times, and any IPPV purchase data.

Although not currently implemented, the system manager could download an addressed viewer statistics transaction to a subscriber who has agreed to permit monitoring of his viewing habits. In yet another embodiment, the system manager could download an addressed viewer statistics transaction to a particular group of set-top terminals.

RF-IPPV PROCESSOR DESCRIPTION

Figure 8:
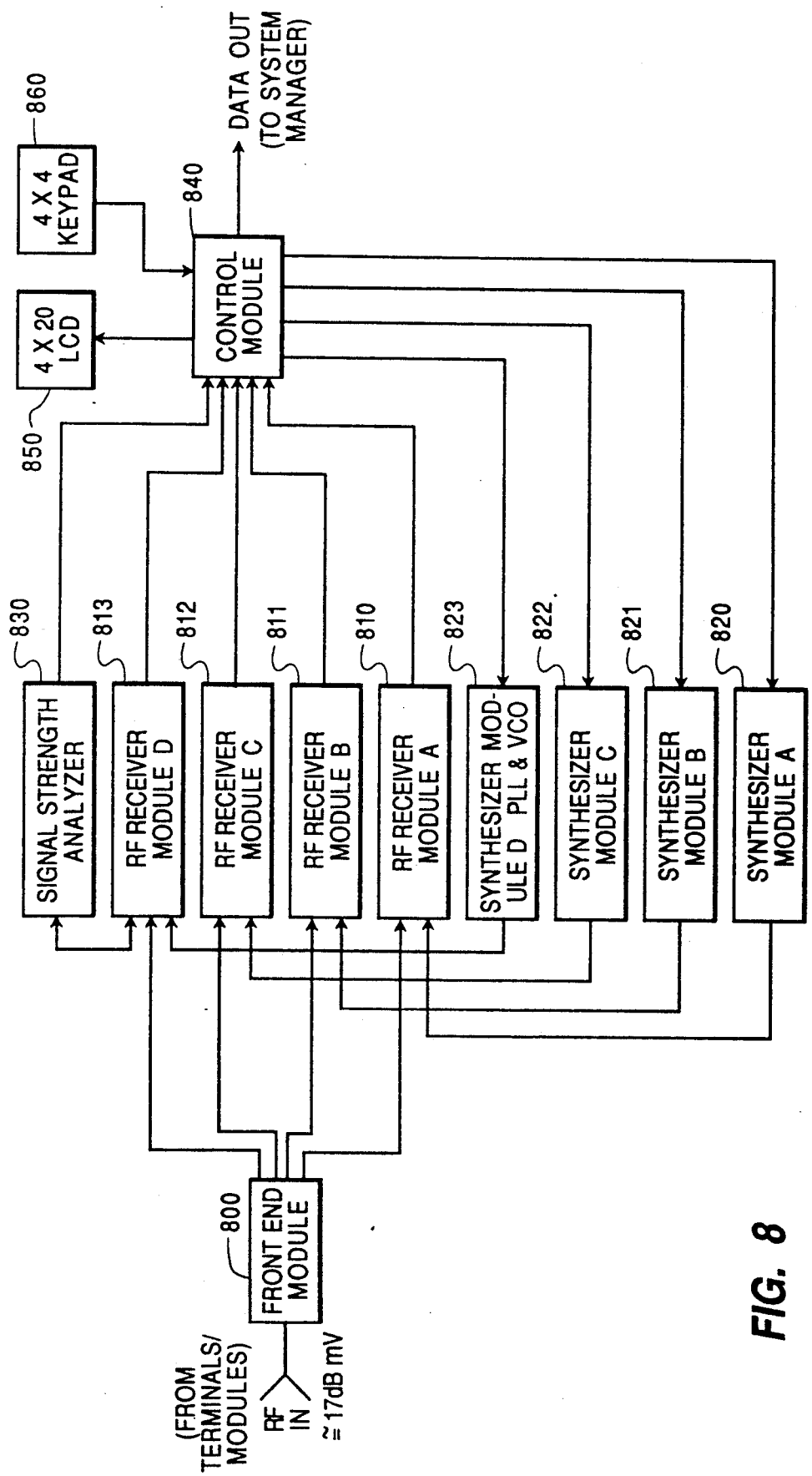
FIG. 8 is a block diagram of the RF-IPPV processor (receiver) shown in system diagram FIG. 3.

Referring now to FIG. 8, there is shown a block diagram of the RF-IPPV processor of FIGS. 1 and 3 in greater detail. The RF return signal from the set top terminals is transmitted in the sub-VHF channel T8. The set top transmitted carrier can be set, with 100 kHz resolution, in the frequency range of 11.8 to 17.7 MHz providing a maximum of 60 and preferably, 23 different 100 kHz bandwidth data channels to select from. The modulated carrier from the set-top terminal or module contains 20 KBPS Miller encoded BPSK information. The RF signals from the entire set top terminal population in the system are combined and returned to the RF-IPPV processor located in the headend. The function of the RF-IPPV processor is to accept RF return input signals, demodulate the information, and supply the decoded message to the system manager.

Referring still to FIG. 8, the RF return signal is typically received at a single carrier level of +12 dBmV. The RF-IPPV processor is designed to function with a range of single carrier levels of +2 to +22 dBmV. Often, more than one carrier is received simultaneously, and the total received power will be proportionally greater than +12 dBmV. If on different frequencies, the RF-IPPV processor can simultaneously receive, demodulate, and decode four modulated carriers, only the non-redundant, decoded messages are sent from the control board of the RF-IPPV processor to the system manager through the RS 232 serial interface.

The first element to be described of the RF-IPPV processor is a so-called front end module 800. The RF return signal from the terminal is routed from the incoming cable to a connector of the front end module 800 which most conveniently comprises a separate assembly. The front end module 800 offers the input signal a terminating impedance of 75 Ohms nominal. This assembly consists of a bandpass filter, a preamplifier and a power dividing network which splits the incoming RF signal to the four RF Receiver Modules A–D. The bandpass filter will pass the T8 band with negligible attenuation and distortion while rejecting out of band signals. The preamplifier compensates for filter insertion loss and power splitting losses. The RF signals are routed from RF connectors of the front end module to the four RF receivers. The front end module has approximately 1 dB of gain, so that the signal applied to the RF receivers 810-813 is approximately at +13 dBmV. All coaxial interconnections internal to the RF-IPPV processor, with the exception of the incoming RF signal are terminated in 50 Ohms nominal. A cable assembly supplying +24 Volts DC and ground is routed directly from a power supply assembly (not shown) to the front end module. The front end module 800 does not directly interface with the control board module 840. All other receiver and synthesizer assemblies in the RF-IPPV processor include an interconnection to the control board module 840.

The second primary building block of the RF-IPPV processor is the RF receiver. There are four RF receiver assemblies A-D 810-813 in the RF-IPPV processor. These are functionally equivalent units, three of which support a 50 Ohm termination in the signal strength analyzer(SSA) output port, so the units may be interchangeable. The fourth (Channel D) is shown with a coaxial interconnection to the SSA Assembly 830. The RF receiver downconverts the front end module routed signal using the frequency synthesizer output as a high side local oscillator. The synthesizer output frequency may be between 22.5 and 28.4 MHz and is preferably 26.2 to 28.4 MHz corresponding with the input frequency range of 11.8 to 17.7 MHz, or preferably 15.5 to 17.7 MHz. The IF signal is at a center frequency 10.7

MHz. Ceramic IF Filters, centered on 10.7 MHz, reject adjacent channels and other mixer products while passing the intended signal. The narrowband filtered IF signal is then detected by a circuit which provides a rough estimate of signal strength (RSSI). The RSSI output is a DC voltage, proportional in magnitude to the level of the received RF signal level. The RSSI voltage is routed to the control board module, along with other signals by an RF receiver interface ribbon cable assembly. The RSSI information is indicative of set top RF return signal level as received by the RF-IPPV processor. This information is made available to the system manager.

RSSI data for a particular terminal is indicative of terminals requiring recalibration. To this end, the system manager maintain lists of RSSI "too high" or "too low" data for terminals so that unique addresses for those terminals may be queued for recalibration. Such recalibration is not periodic but performed on a higher priority basis, that is, on an equivalent priority to new terminals requiring calibration for the first time. Also, tabulated RSSI data, over a period of a time, may be used for determining slope/tilt characteristic curves for all the twenty-three channels over which messages may be sent from a particular set-top terminal. The slope/tilt characteristic curves are then downloaded to the terminal so the set-top terminal may determine appropriate transmit levels for all category one and category two channels from the optimum result for the calibration channel.

The main function of the RF receiver is to BPSK demodulate the 10.7 MHz IF signal. The signal is demodulated utilizing a double balanced mixer. The demodulated data stream is filtered and synchronized. This detected 20 KBPS Miller encoded data is routed to the control board module. The RSSI and BPSK demodulation functions are performed by each of the four RF receivers. The narrowband filtered 10.7 MHz IF signal at an approximate level of +13 dBmV is routed from RF Receiver D to the signal strength analyzer assembly.

Associated with RF receiver operation is a signal strength analyzer 830. The function of the signal strength analyzer assembly is to detect the level of the 10.7 MHz IF signal routed from the RF receiver assembly chosen for calibration purposes. The RF receiver output does not undergo automatic gain control (AGC); as a result, any changes in RF input level to the RF-IPPV processor will result in a changing 10.7 MHz IF level to the SSA. When the RF return system undergoes calibration, by detecting the 10.7 MHz IF, the SSA provides the control board 840 an indication of what terminal/module transmit level corresponds with a received signal level of +12 dBmV. The control board 840 will in turn advise the system manager through the RS232 interface. Until the next calibration cycle, (described in detail hereinafter) the system manager will instruct the set top terminal to utilize the control board reported transmit signal level.

The +13 dBmV 10.7 Mhz IF signal is terminated in 50 Ohms by the SSA. Two buffer amplifiers apply approximately 30 dB of IF gain. The amplified signal is peak detected by a diode based network. A second diode based network is similarly DC biased. The two diode networks are summed to provide temperature compensation in accordance with well known techniques. The output accurately reflects the IF level, as the diode DC components cancel out. This detected signal is filtered and further amplified. The final output DC signal, proportional to the IF signal level, is routed to the control board.

The frequency synthesizer under control of the system manager synthesizes frequencies for demodulating the incoming data carriers. The frequency synthesizer is the local oscillator for the single frequency conversion performed in the RF Receiver. A single frequency synthesizer assembly contains four discrete units 820-823. The control board 840 supplies, through serial data commands, frequency tuning information. The four frequency synthesizer units 820-823 are labeled frequency synthesizers A, B, C, and D, to correspond with the four RF receivers 810-813. There are a total of sixty frequencies in the T8 channel bandwidth that can be set by the control board 840; however, according to the present invention, only 23 are used. The output frequency range is preferably 25.1 to 28.4 MHz and is downconverted to the upper portion of the T8 band, i.e., 14.4 to 17.7 MHz. The frequency resolution is 100 kHz. The output signal is at a typical level of +17 dBm.

Each frequency synthesizer unit contains an oscillator, frequency divider, phase locked loop (PLL), an integrated circuit (IC), and an active loop filter. These components together form a phase locked loop. The output frequency of the oscillator is phase and frequency coherent with a free running 4 Mhz crystal oscillator. The PLL assures that the synthesizer output will be spectrally pure and frequency accurate. The oscillator output drives a push-pull amplifier. The push-pull design is utilized to supply the required +17 dbm local oscillator level.

Figure 9:
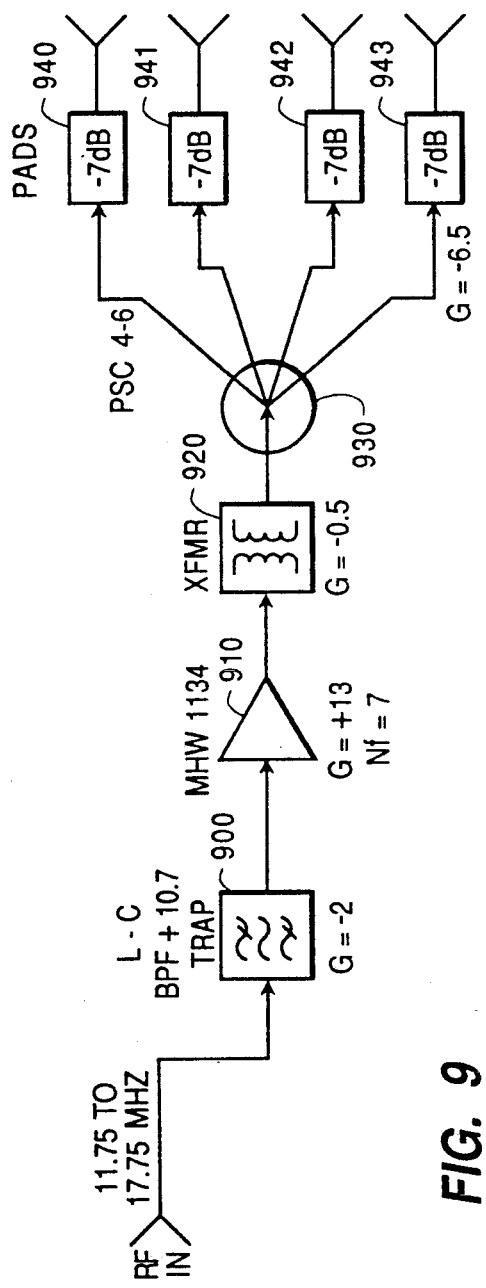

The front end module is shown in block diagram form in FIG. 9. The front end/power divider module consists of a bandpass preselector filter 900, a preamplifier 910 consisting, for example, of a MHW1134 and a dividing network 930 to supply four RF receiver modules. Gains through the module including transformer 920 are shown listed below each element.

Figure 10:
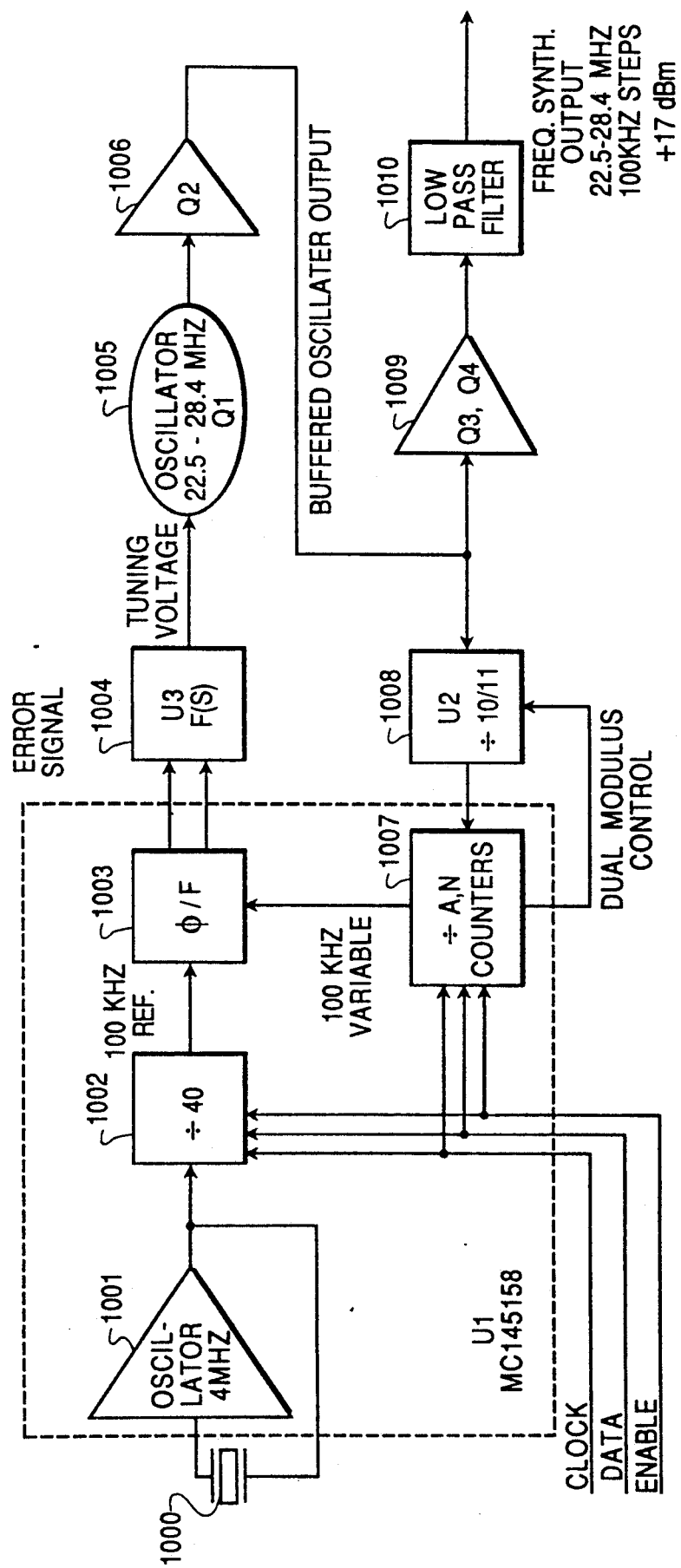

Referring now to FIG. 10, the frequency synthesizer assembly of the RF-IPPV processor will be described in further detail. The frequency synthesizer assembly contains four PCB sub-assemblies as per FIG. 10. Each of the sub-assemblies is set to frequency by the RF-IPPV processor's control board 840. The range of the frequency synthesizer is preferably from 26.2 MHz to 28.4 Mhz but may be as wide as 22.5 to 28.4 MHz. The tuning resolution is 100 kHz. Each of the four frequency synthesizer sub-assemblies can be set to any of the 60 channels in the 22.5 to 28.4 MHz range. The RF output of the frequency synthesizer sub-assembly is the local oscillator signal of one-of-four RF receivers in the RF-IPPV processor. The local oscillator is high side, so that the RF range of 15.5 to 17.7 MHz is downconverted to the receiver IF of 10.7 MHz. FIG. 10 is a block diagram of the frequency synthesizer sub-assembly. Again, there are four such sub-assemblies in the frequency synthesizer assembly.

A 4 MHz fundamental mode crystal 1000 is connected to a high gain feedback amplifier 1001. The amplifier is part of PLL (Phase Locked Loop) LSI(-Large Scale Integration) device, U1, preferably a Motorola MC145158. The 4 MHz output signal is routed within U1 to a frequency divide 40 counter 1002. The output of the counter is a 100 kHz reference signal which is routed within U1 to a phase/frequency detector 1003.

The phase/frequency detector 1003 compares the two input signals (100 kHz reference and 100 kHz variable), and generates error signal pulses when the two inputs are not at the same frequency and phase. These pulses tune the oscillator such that the 100 kHz variable frequency signal is forced to the same frequency and phase as the 100 kHz reference signal. When this occurs, the frequency synthesizer output will be at the correct frequency. The differential error signals from the phase/frequency detector 1003 are routed from U1 to loop filter U3 1004 and associated components. U3 filters the error signals, and converts it to a single ended tuning voltage that steers the oscillator 1005. The oscillator 1005 is composed of Q1 and associated components. The oscillator 1005 is designed such that tuning voltages at the input result in output frequencies that contain the desired output range of 22.5 to 28.4 MHz or more preferably 26.2 to 28.4 MHz. The oscillator output is routed to buffer amplifier Q2 1006. The buffer amplifier 1006 offers a relatively high impedance, and isolates the oscillator from dual modulus divider U2 1008, and power amplifier Q3, Q4 1009. The buffered oscillator output signal is routed to dual modulus divider U2, where the frequency is divided by 10 or 11. Programmable divider U2 together with dividers A and N 1007 form a total divide by ratio $N_t = 10 \times N + A$. Counters N and A are programmed by the control board 840, through serial data commands, of the RF-IPPV processor such that $Fout = Nt \times 0.1$ MHz. For example, the control board sets $N_t$ to 250 for an output frequency of 25.0 Mhz. $N_t$ can be set by the control board for any one of sixty values between 225 and 284 but preferably between 251 and 284. The function of the dual modulus control line is to establish when U2 will divide by ten, and when it will divide by 11.

Buffer Amplifier Q2 also drives power amplifier Q3, Q4 1009. There is a potentiometer adjustment utilized (not shown) such that the output signal level is approximately +17 dBm. The power amplifier is followed by a low pass filter 1010 that attenuates primarily the second and third harmonic of the synthesizer output signal. The +17 dBm frequency synthesizer output is routed to an associated RF receiver assembly of the RF-IPPV processor.

Figure 11A:
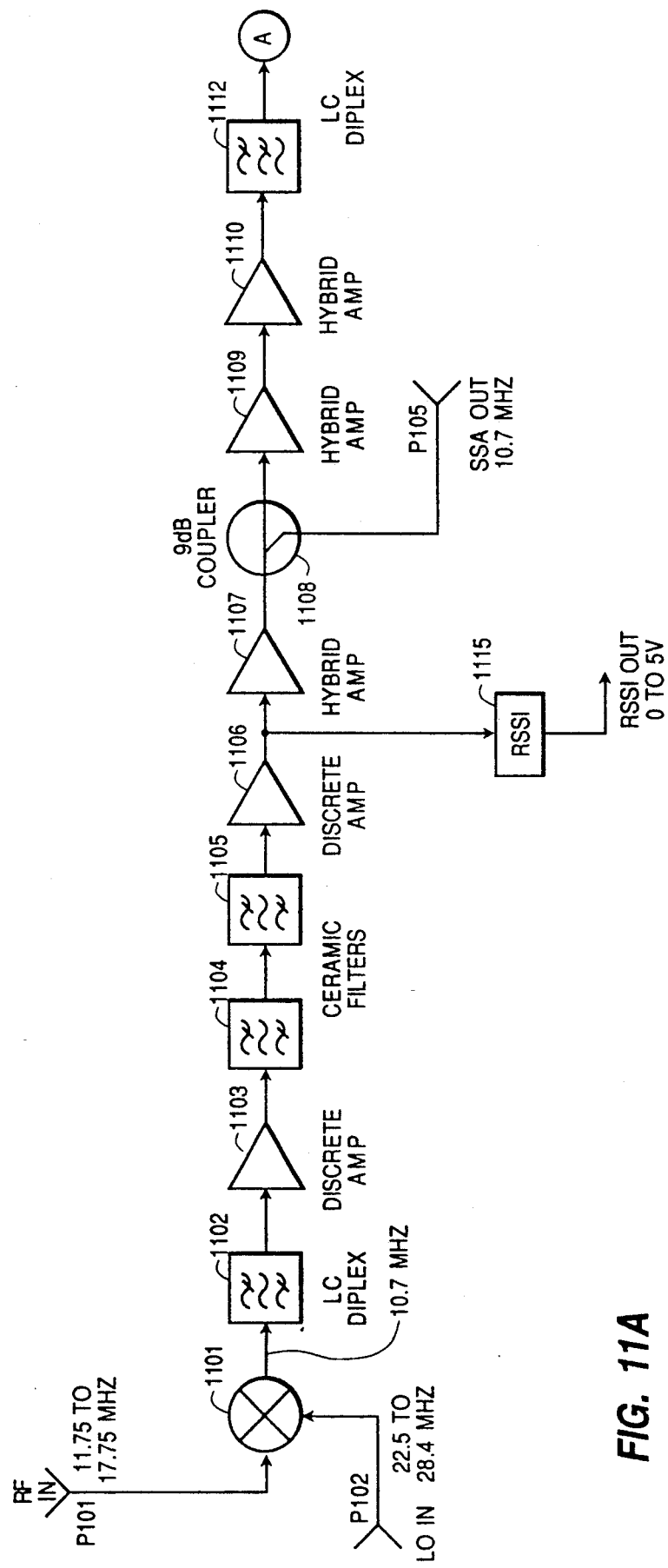
Figure 11B:
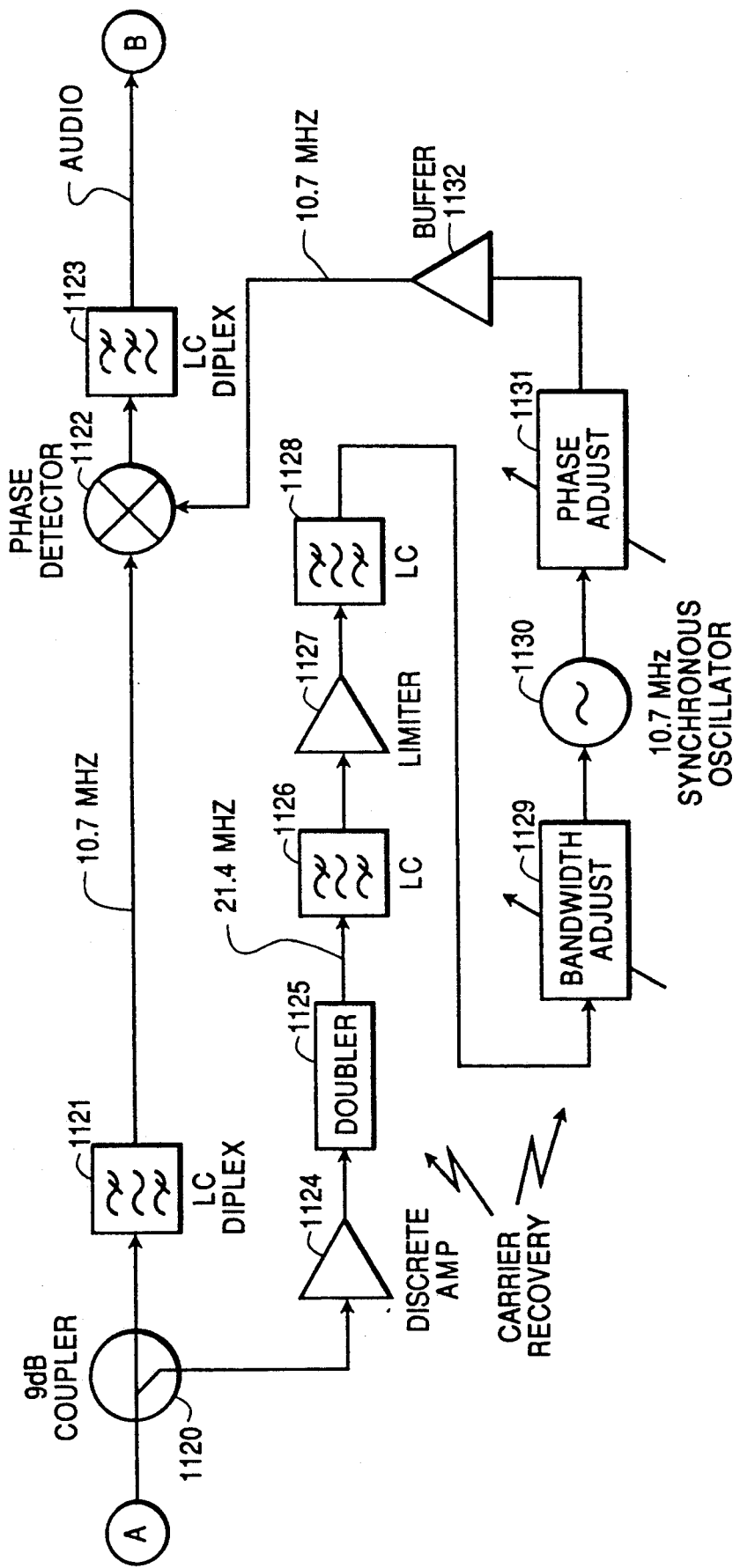
Figure 11C:
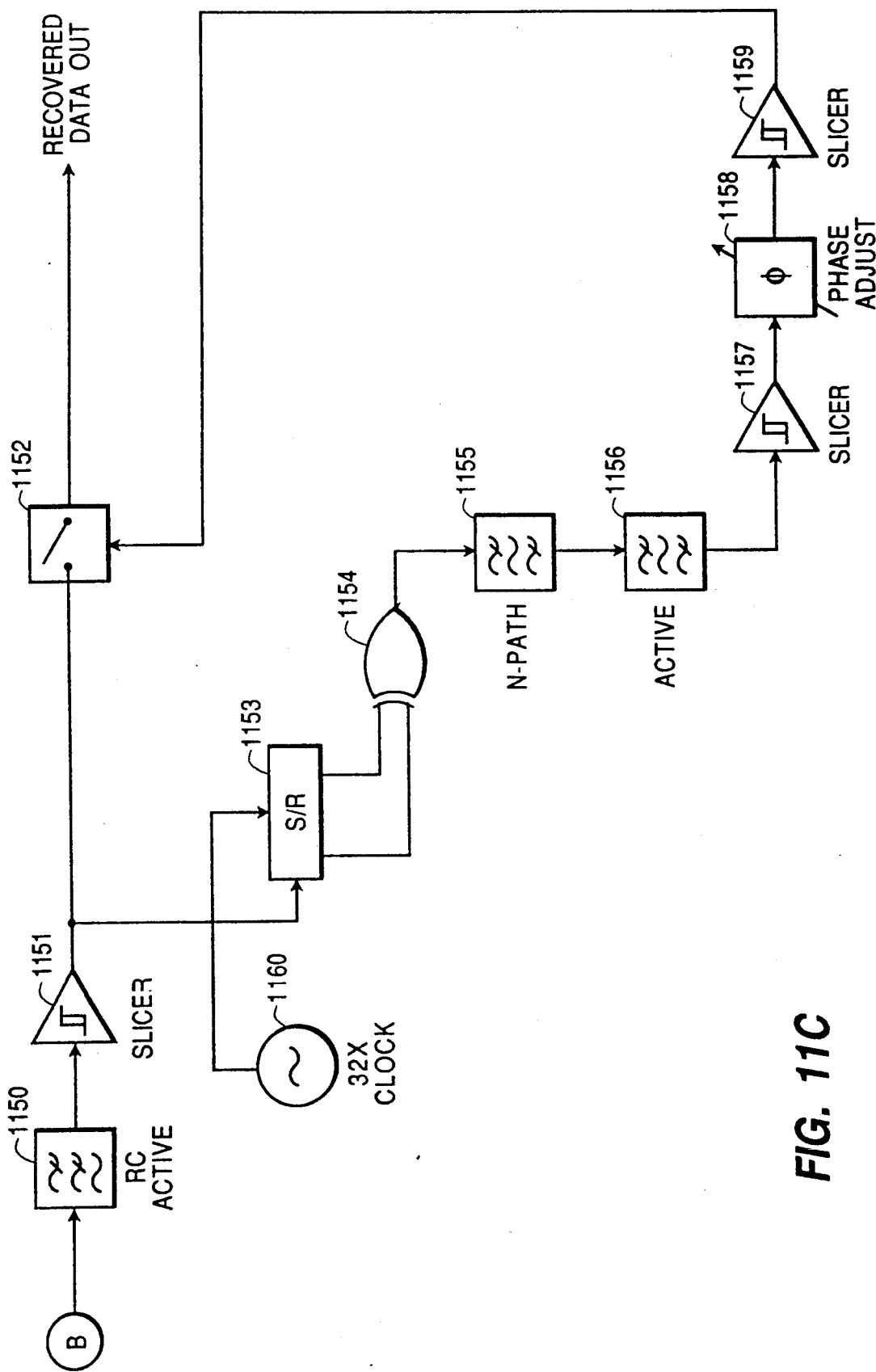

The RF receiver module is shown in block diagram form in FIGS. 11A-C. There are four separate RF receiver (RFRX) modules. Referring first to FIG. 11A, each RF receiver contains a mixer 1101 to convert the input signals to an IF frequency of 10.7 MHz. High-side injection is used. The IF signal is passed through ceramic filters 1104, 1105 to reject adjacent channel signals and distortion products.

The IF is then passed through an amplifier 1106 and level detector 1115. The detector circuit provides a rough estimate of signal strength (RSSI). The detector circuit 1115 is constructed, for example, from an NE60-4AN in a well known manner. The RSSI output is an analog voltage which is sent to the controller/processor module 840 for digitalization and transmission to the system manager.

The IF is then passed through a directional coupler 1108. The tap output is routed to an external port for use by the signal strength analyzer (SSA) module. The IF signal is then further amplified and directed to the demodulator.

Referring now to FIG. 11B, the demodulator preferably consists of a frequency doubler 1125 and injection-locked oscillator 1130 for carrier recovery. Data recovery, per FIG. C, is achieved via a modem filter, a clock recovery circuit and sampler. The output of the demodulator is digital data.

Figure 12:
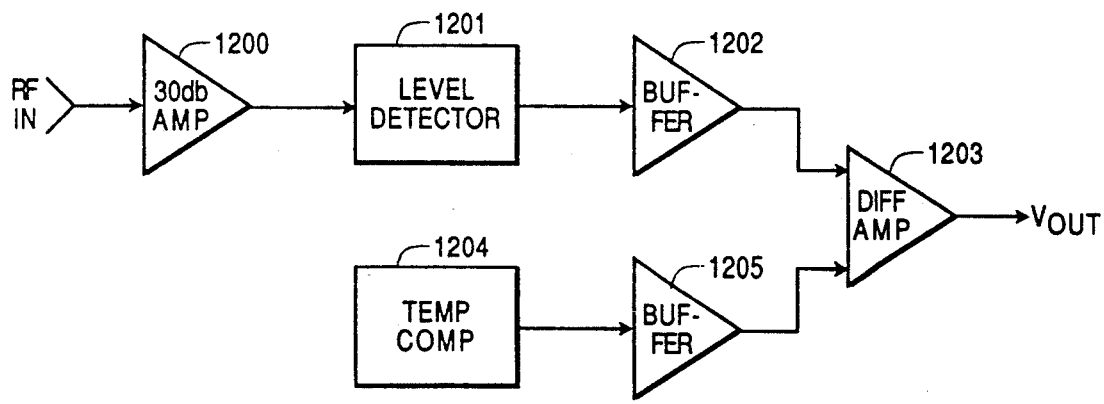
FIGS. 9-13 are schematic block diagrams of the several component assemblies of the RF-IPPV processor of FIG. 8.

Referring now to FIG. 12, the signal strength analyzer is shown which receives the signal strength indicator signal from the RF receivers. The signal strength analyzer (SSA) module is used to get a high accuracy measurement of data transmitted power. The RF signal to be measured is routed from the IF of one of the RF receiver modules, for example, channel D. The signal strength analyzer module consists of a 30 dB preamplifier 1200, level detector 1201 and a buffer stage 1202. The output is an analog voltage which is sent to the controller/processor module for digitalization and transmission to the system manager. Two separate diodes are used for temperature compensation prior to input to the differential amplifier 1203, i.e., diode 1204 compensates for diode 1201.

Figure 13:
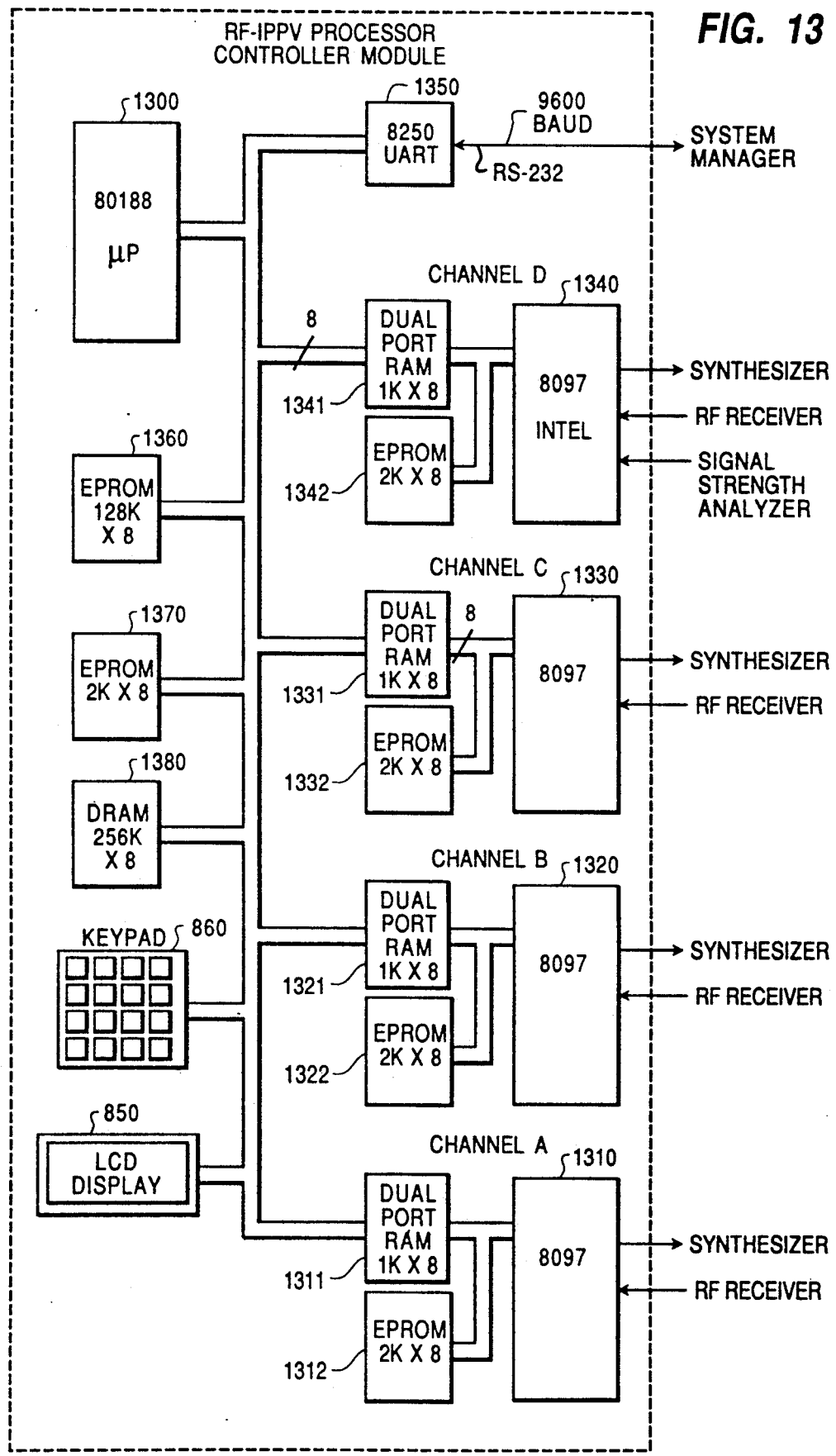

Referring now to FIG. 13, the controller module is shown which manages the operation of the RF-IPPV processor. The module configures the synthesizers, monitors signal strength, decodes messages received by the RF receivers, checks messages for validity, and forwards messages to the system manager. The controller module includes a user interface (keypad and display) for diagnostics, error reporting and switchless configuration. Referring again to FIG. 14, there is shown a main menu from which an operator may select from Monitor, Setup, and Calibration functions. From the Monitor menu, the operator may select from six initial screens, the SSA screen for signal strength analysis leading the operator to RSSI. The Setup and Calibration menus operate similarly.

The controller board consists of six functional blocks according to FIG. 13: an 80188 microprocessor 1300, a memory subsystem, receiver interfaces including 8097 processors and dual port RAMS for each receiver, a system manager interface, and front panel interface.

The control microprocessor 1300 used on the controller module is an Intel 80188. This is a 16 bit processor that includes 2 channels of DMA, 4 interrupts, 3 timers, 13 decoded address range and an 8 bit external interface.

The memory subsystem consists of 256K of dynamic RAM 1380 for message and variable storage, 2K of nonvolatile RAM 1370 for parameters, and sockets for 128K of EPROM 1360 for program storage.

Two 256K DRAMs are used for the DRAM array. These are for storing, for example, the group statistics, valid received messages, calibration results and such for the set-top terminals of the system. Consequently, these memories must be appropriately sized for storing the packet data. When the message data is transmitted to the system manager, the tables for storing terminal message data are cleared. Every time a read cycle to the EPROM occurs a "CAS before RAS" refresh cycle is given to the DRAM array. Normal code fetches to the EPROM should be sufficient to keep the DRAM refreshed. If there are more than 15 us between EPROM accesses, the DMA controller will read the EPROM. LCS on the 80188 is used to access the DRAM array. After reset, LCS must be programmed for an active memory range. After the initial setup of the DMA controller, refresh will occur without software intervention.

Two EPROM sockets are provided for up to 128K of program memory. These sockets can use any EPROM between 2764 and 27512. One socket is accessed by UCS and the other by MCS3. After a reset condition UCS will be active in the memory range from hex FFBFO to FFFFF. MC53 must be programmed for an active range.

One 2K EEPROM 1370 is provided for nonvolatile storage of configuration information. A programmer must be careful not to access the EPROM for 10ms after a byte has been written to the chip. There is not a recovery delay after a read cycle. The chip is accessed by MCSO. MCSO must be programmed for an active range.

Each RF receiver channel has a dedicated Intel 8097 1310-1340 as an interface element. The 8097 processor decodes and frames the Miller encoded data from the RF receiver (RFRX) module, monitors the signal strength level from each RFRX module as well as from the signal strength analyzer (SSA) module, and controls the frequency of the RF synthesizer (SYN) module.

Each 8097 has its own associated 1k byte Dual Port RAM 1311-1341. These dual port memories are used to pass data and commands between the 8097s and the 80188. The memory includes a mechanism for bidirectional interrupts. The software can define any convenient protocol for using the memory and interrupts. EPROMS 1312-1342 are provided for program storage for the 8097's.

A conventional UART 8250 serial chip is used to implement a serial interface 1350 to the System Manager. One of the 80188 interrupts is connected to the 8250 so the serial channel may be interrupt driven. The 8250 can operate at frequencies up to 38.4K baud.

Modem handshaking signals are avaiable (RTS,DTR,etc.). The multiplexer on the system manager may utilize or ignore these signals as desired. The receiver will be configured as a DTE, similar to the known phone processor board.

The front panel consists of a keypad 860 and a LCD display 850. Keypad 860 is most conveniently a sixteen key keypad comprising decimals 0-9 and function keys such as help, next page, next line, enter, clear, and menu. The keyboard/display provides for switchless configuration, meaningful error indications, and local access of built-in test and diagnostic routines.

The LCD display for four lines of twenty characters is accessed via two registered ports. Display data is loaded into one port and the strobe commands are loaded into the second port. The strobes to the display are relatively slow (1 $\mu$S).

When a key is pressed, an interrupt is generated to the 188. The encoded key data can be identified by reading a four bit register. When this register is accessed the interrupt is cleared. The keypad logic includes a debounce circuit which prevents another interrupt from being generated until the end of the debounce delay.

The controller module also serves the role of power distribution for the RF-IPPV processor. The controller module switches power to elements as required. Each cable that connects this board to an RF receiver or a synthesizer includes 4+12 V lines, 3-12 V lines, 3+5 V lines and 6 ground lines as required.

SYSTEM MANAGER CALIBRATION CONTROLLER

The system manager RF-IPPV calibration controller program along with the RF-IPPV processor are responsible for calibrating RF-IPPV module transmitters associated with set-top terminals. The calibration process insures that data being transmitted from the set-top to the RF processor arrives at an appropriate level. Furthermore, by automatically and periodically calibrating all terminals in a system, any requirement for automatic gain control at the RF-IPPV processor is eliminated. The calibration controller controls the flow of commands to the RF-IPPV module during the calibration sequence and based on responses received from the module, determines its calibration status. The calibration status is discussed below.

The calibration status of the RF-IPPV module has five possible values. These are listed below:

NEVER CALIBRATED—initial status when the terminal is placed into system;

NEEDS CALIBRATION—replies from the terminal indicate that it needs to be re-calibrated;

CALIBRATION FAILED—a calibration was attempted and the terminal responds but a proper transmit level could not be determined;

NO RESPONSE—a calibration was attempted but no response was received from the terminal; and CALIBRATED—calibration was attempted and completed successfully.

When a terminal/module is initially placed into the system, its calibration status is "NEVER CALIBRATED". After a request is made to calibrate the set-top, the status is changed to 'CALIBRATED', 'NO RESPONSE', or 'CALIBRATION FAILED', in the system manager memory, depending on the responses from the terminal/module, if during data collection (i.e. RF Auto Reply) it is determined that the transmit level of a terminal is not within an acceptable range the calibration status is set to 'NEEDS CALIBRATION',

RF-IPPV SYSTEM-MODULE LEVEL CALIBRATION DESCRIPTION

Calibration requests are sent to the calibration controller from two sources. The first is the set-top itself. When an uncalibrated set-top terminal is initially powered up (PICART is enabled), it sends a calibration request through the RF processor to the calibration controller of the system manager. The calibration controller takes this request and initiates the calibration sequence.

An uncalibrated set-top terminal may also send a calibration request when a specific front panel key sequence is performed. After pressing the appropriate key sequence (MICART is enabled), the set-top terminal sends a calibration request through the RF processor to the calibration controller. The calibration controller then initiates the calibration sequence.

The second source of calibration requests is the system manager and host billing computer users. When a set-top is added to the system through the host billing computer, a request for calibration is sent to the calibration controller. The calibration controller takes this request and places it on a queue where it remains until there is time to process it.

Finally, a calibration request may be sent by pressing a function key input from a system manager IPPV display screen. The calibration controller will take this request and place it on the queue.

Calibration requests received from the set-top terminal are considered high priority and are processed before requests received from the system manager and host billing computer users.

The following steps describe the sequence of events which occur during a successful calibration process. Note that this sequence is viewed from the calibration controller and is not meant to be a detailed description of the functionality of the RF-IPPV module or the RF processor hardware described elsewhere.

a. The calibration controller either receives a priority calibration request from the set-top terminal or takes a user calibration request from a queue.

b. The calibration controller verifies that the requested calibration can be performed. It then sends a command instructing the set-top terminal to begin its stepped calibration sequence, c. The RF processor determines optimum transmit level based on the stepped calibration sequence.

d. The calibration controller receives the optimum level from the RF processor and instructs the set-top terminal to transmit a single calibration message at that level.

e. The RF processor evaluates the received calibration message to determine that the transmit level is within limits ('OK').

f. The calibration controller receives the 'OK' indication from the RF processor and instructs the set-top terminal to transmit a single calibration message at the optimum level and to store that level for future transmissions.

g. The set-top terminal stores the specified optimum transmit level and transmits a single calibration message at that level.

h. The RF processor again evaluates the calibration message and sends an 'OK' indication to the calibration controller.

i. The calibration controller receives the 'OK' indication and updates the calibration status to 'CALIBRATED'.

j. The calibration controller processes the next calibration request.

Below are the issues which are discussed in the following section of the application:
1) Module Calibration procedures-overall system;
2) STT initiated calibration procedures; and
3) RF-IPPV calibration indication.

Before discussing calibration, a block diagram of the RF-IPPV system will be again discussed as is shown in FIG. 3. The terminal/module has its own processor to process system transactions, allow IPPV purchases and event storage, record viewing statistics, and operate the transmitter to return data to the headend. The RF processor at the headend decodes the RF-IPPV transmissions and passes the information to the system manager. The RF processor is very similar in function to a phone processor known in the art. The RF processor however, additionally measures the received signal level which is used for calibration of the modules. A preferred received signal level is +12 dBmV.

Outband and Inband transactions to handle the RF-IPPV system which differ from telephone line data return include auto-reply parameters, calibration parameters, frequency and levels parameters, RF-IPPV group numbers, RF-IPPV viewing statistics, RF-IPPV acknowledge reply, and memory dump transactions which have already been discussed in some detail.

The system has two categories (or sets) of transmission frequencies with four frequencies in each category which can be used by the cable operator in any manner he chooses such as one set for day transmissions and one set for night transmissions. These two categories of frequencies were chosen because the cable system noise may change over temperature and time so the system was designed to easily change with system and environmental changes. Four frequencies per category were chosen to increase the data return rate by reducing the probability for transmission collisions. Furthermore, by choosing four different frequencies, the likelihood of noise interference with transmission on all four frequencies is reduced. These eight frequencies may be initially determined through spectrum analysis processes and results graphs as per FIG. 2. The RF processor shown has only four receivers for four frequecies but a larger or smaller number of selected channel frequencies may be implemented without violating the principles of the present invention. The system has been designed to allow one of the four RF processor receivers to be used for calibration during the hours when module calibrations are being performed. This receiver can be used for data return when module calibrations are not being performed. The calibration frequency can be any specified frequency because this frequency may be selected independently of the selection of the two categories of four data carrier frequencies.

SYSTEM OPERATOR INITIATED CALIBRATION

For this discussion it is assumed that calibration has been initiated from the system manager instead of the terminal/module because the latter case is discussed next. The system manager will store several pieces of information concerning the RF-IPPV module. The system manager keeps records of the particular terminals which have associated RF-IPPV modules. Also stored are two calibration status bits which represent that the module: a) needs to be calibrated; b) responded to calibration but could not be calibrated; c) did not respond to the calibration request; or d) module properly calibrated. Below is a step by step calibration operation:

1) The system operator checks the calibration status for a particular terminal or requests a print out of all terminals which need their RF-IPPV module transmitter calibrated (modules which have the calibration bits indicating conditions a, b, or c above). The system manager may then determine which module to calibrate automatically in accordance with a first in first out or other algorithm.

2) The system operator begins to calibrate a particular terminal/module transmitter. The system manager may automatically select the calibration frequency. The calibration transmission length will be fixed, for example, in the system manager to 50 msec. This transmission length can only be changed through the system manager "back door". Once the calibration frequency is selected, the frequency may need not be changed; however, the system has the flexibility to periodically and automatically change the calibration frequency as appropriate. The system manager will only allow one terminal/module to be calibrated at a time in order to prevent collisions.

3) The system manager sends an initiate calibration parameter transaction to the ATX and Headend controller.

4) The ATX and Headend controller sends an addressed only calibration parameter transaction throughout the cable system.

5) The terminal processor passes this transaction to the RF-IPPV module terminal if the address contained in the transaction matches the terminal/module address.

6) The RF-IPPV module then begins the calibration reply. The module begins transmitting at transmission level zero for the specified transmission length. The module then will step through every other step to the maximum level of 14 for a total of 8 transmissions. The transmitter is off between each transmission for approximately 220 msec.

7) The RF processor receives the module calibration transmissions and measures the power level. The processor has stored in memory the boundaries for optimum level. These boundaries are determined during calibration of the processor. The system is designed for a +12 dBmV level. The processor determines which transmission level is optimum. If the transmitted level is too low, the low levels are discarded until an ok level is received. The processor can interpolate between two levels if necessary. By way of example, assume that module level 10 was optimum. Since the duration of calibration transmissions is fixed at a predetermined value, for example, 50 m sec., the RF processor can also determine if there are missing steps by checking the timing of received messages.

8) The processor lets the system manager know that the module responded and that level 10 was acceptable.

9) The system manager sends the calibration parameters to the ATX and/or Headend controller specifying level 10 as the level at which to send a calibration message.

10) The ATX and/or Headend controller sends an addressed calibration parameter transaction throughout the cable system.

11) This transaction is passed to the module if the address matches. This time the module will only transmit at level 10 (not all levels of the sequence of eight possible levels) for the specified transmission length. This message contains an indicator to show that it is a single calibration message.

12) The RF processor will again measure the received transmission level and determine if it is still acceptable.

13) Assuming that the level is acceptable, the RF processor lets the system manager know that the received level was acceptable.

14) The system manager now sends the calibration parameters to the ATX and/or Headend controller with level 10 as the calibration level and requests the module to store this level in its NVM. The system manager then requests a single calibration message at the level a final time.

15) The ATX and Headend controller sends a calibration parameter transaction throughout the cable system.

16) This transaction is passed to the module. The module will store level 10 for all 8 (2 categories of 4 frequencies) transmission frequency levels. Levels for the other seven channels from the calibration channel may be determined most conveniently from download slope/tilt channel characteristics which have been predetermined for transmission from the particular addressed set-top terminal. The module will also set the calibration bit in NVM to calibrated. The module will then a send final single calibration message. If the RF-IPPV processor validates the message, the system manager will change the status of the terminal to calibrated.

As described above, this is the normal calibration procedure. While "high, low and ok" responses to a calibration level transaction are typical, a fourth possibility is "don't know", when, for example, a timing error is detected at step 7. There are several deviations from the normal process which can occur during the calibration procedure.

1) Suppose the module does not respond to the system manager's request to initiate the calibration procedure. The system manager will time out in an adjustable period if no response is received from the module. The system manager will send the initiate calibration procedure for a total of three times. If still no response, the system manager will store that the module did not respond to calibration.

2) Suppose the module did respond to the initiate calibration transactions, but that the received level was unacceptable. The RF processor will let the system manager know that the module responded but the level was unacceptable. The system manager will send the initiate calibration procedure for a total of three times. If all the received levels were unacceptable, then the system manager will store that the module responded to calibration but the calibration failed.

3) Suppose that the RF processor received an acceptable level from the module. The system manager then requested that the module transmit at the acceptable level only. This time the processor did not receive the calibration signal from the module for the acceptable level or the RF processor received the calibration signal from the module, but the level was unacceptable. In this case the system manger will request that the module transmit on the acceptable level for a total of three times. If the processor never receives another acceptable level, then the system manager will store that the module responded to calibration but still needs calibration and so attempt another eight step calibration.

Now a terminal/module initiated calibration procedure will be explained. The calibration procedure is the same as mentioned above except for the manner in which the procedure is initiated. Instead of the system operator selecting a terminal/module to calibrate, the terminal/module sends a request calibration message to the RF processor. The RF processor can determine that the terminal has initiated the calibration procedure from an indicator contained within the message. When the processor receives this message, it is passed to the system manager which begins the calibration procedures as described above.

There may be at least two methods provided to initiate calibration from a terminal: the terminal will initiate calibration upon power-up or will initiate calibration when a correct key sequence is entered by the keys, for example, by a maintenance person. There are calibration status bits in NVM which are used when a terminal decides between power-up or manually initiated calibration provided the terminal status is not calibrated.

If the module calibrated bit indicates that the module needs to be calibrated and the power-up initiated calibration bit is enabled, then the terminal will begin sending data to the RF processor to request to be calibrated when the terminal is powered-up. The module will transmit at a predetermined default level stored in NVM (preferably a relatively high level). The module will also transmit randomly on all four category one frequencies for the first three minutes. If the terminal does not receive a calibration parameter transaction from the headend, then the module will transmit randomly on all four category 2 frequencies for the next three minutes. If the terminal still does not receive a calibration parameter transaction from the headend, then the module will discontinue attempts for requesting calibration until the terminal/module power is removed and applied again. The module will request calibration on every power-up until the module is calibrated or the terminal receives a transaction to disable power-up initiated calibration. The transaction to disable power-up initiated calibration will only be accessible through the system manager "back door".

On the other hand, if the key sequence initiated calibration is enabled, then the terminal/module will begin sending data to the RF processor to request to be calibrated when the appropriate key sequence is pressed by the terminal keys. One can request calibration from the terminal even if the module is calibrated as long as this method is enabled. In order to initiate calibration, an installer will need to enter a predetermined sequence of keys) and enter yet another key. If this special key sequence is performed, then the module will send data to the processor requesting to be calibrated in the same manner as described in the power-up initiated calibration. The module will initiate the calibration every time the special key sequence is pressed until the key sequence initiated calibration bit is disabled from the headend. The key sequence initiated calibration can be disabled by the system operator. Once the module transmitter is calibrated, the key sequence initiated calibration may be disabled for the terminal. This will prevent subscriber from accidentally calibrating the module. When the terminal is disconnected from the system in order to move it to another house, then the key sequence initiated calibration should be enabled again.

Two methods to initiate calibration are provided for different installation scenarios. If the subscriber picks up the terminal from the cable office then the terminal will use the power-up initiated calibration because it is probably not appropriate for the customer to know the key sequence. If a cable installer installs the terminal/module in a subscriber's home, then he will use the key sequence initiated calibration. The main reason he will not be able to use the power-up initiated calibration is due to staging problems. When a terminal has been disconnected, the system manager will send a transaction to clear the module calibration status. This will allow the terminal to begin the power-up calibration when the terminal goes through the next power-up sequence. If this sequence occurs before the terminal can be moved from one home to the next without going back to the system headend, the module may be calibrated and the calibration status will indicate that it is calibrated; therefore, the terminal will not initiate calibration upon power-up.

RF-IPPV module calibration indications on a terminal display may be provided primarily for the benefit of an installer. The purpose of this indication is to prevent a future trouble call. One implementation for such an indication is to provide an extra LED inside the module which will indicate if the module is calibrated. Another proposal is to use the diagnostic mode of the terminal to read a special code.

As has already been explained, calibration messages typically comprise the address of the set-top terminal which is responding, the level transmitted and a 10,000 Hz tone at that level. Instead, the terminal may be requested to transmit a known pseudorandom message from which a bit error rate calculation may be determined at the RF-IPPV processor. In this manner, a bit error rate (BER) may be calculated for the data channel under test automatically without any requirement for special test apparatus or an installer visit to the subscriber premises. The bit error rate test may be initiated by the system manager and results tabulated for display in an additional branch of the mean of FIG. 14 on the RF-IPPV processor display. Furthermore, the bit error rate results may be applied by the system manager in data channel frequency selection.

What has been described are the preferred embodiments of the present invention. Other embodiments will be apparent to one of ordinary skill in the art. The present invention is not limited to the embodiments described herein but is only limited by the claims appended hereto.

We claim:

1. In a bi-directional cable television system comprising a system manager for controlling a plurality of television terminals over a cable television signal distribution system, apparatus for automatically calibrating a particular optimum transmit level for transmitting data from the television terminals to the system manager, the automatic level calibration apparatus comprising:
    programmable transmitter apparatus located at said television terminals for transmitting a reply communication having a plurality of levels at a particular calibration frequency in response to an addressed command generated by the system manager,
    programmable receiver apparatus located at said system manager for receiving said reply communication at the particular calibration frequency and for determining an indication of received signal strength for each received level, and
    a controller coupled to said receiver for determining an optimum transmit level for operation of the programmable transmitter apparatus at the calibration frequency from said determined signal strengths.

2. The automatic level calibration apparatus of claim 1, the programmable transmitter apparatus for further transmitting the plurality of levels at any one of a plurality of selectable frequencies, the programmable transmitter apparatus determining an optimum level for operation at each frequency of the plurality of selectable frequencies in response to the controller determination of the optimum transmit level at the calibration frequency.

3. In a bi-directional cable television system comprising a system manager for controlling a plurality of television terminals over a cable television signal distribution system, a method for automatically calibrating a particular optimum transmit level for transmitting data from the television terminals to the system manager, the automatic level calibration method comprising the steps of:
    transmitting an addressed command from the system manager to a particular television terminal to transmit a reply communication at a particular calibration frequency,
    transmitting said reply communication having a plurality of levels from the addressed terminal if the address transmitted with the command matches an address for the terminal,
    receiving the reply communication at the particular calibration frequency at the system manager,
    determining an indication of received signal strength for each received level, and determining an optimum transmit level for transmissions from the addressed terminal from said determined signal strengths.

4. The automatic level calibration method of claim 3 further comprising the initial step of
initiating a request for calibration from the particular terminal to system manager.

5. The automatic level calibration method of claim 4, the calibration request initiating step being responsive to an initial powering of the particular terminal.

6. The automatic level calibration method of claim 4, the calibration request initiating step being responsive to actuation of a predetermined key sequence of the particular terminal within a predetermined period of time.

7. The automatic level calibration method of claim 3 wherein the reply communication transmission step includes transmitting a calibration message comprising the address of the particular terminal, a signal at each signal level, and an indication of each signal level.

8. The automatic level calibration method of claim 7 wherein each calibration message is of equal predetermined length.

9. The automatic level calibration method of claim 3 further comprising the initial step of initiating a request for calibration at the system manager.

10. The automatic level calibration method of claim 9, the system manager initiated calibration request for a particular terminal being responsive to the received signal strength indication determining step.

11. The automatic level calibration method of claim 3, said optimum signal strength determining step including the steps of:
comparing the sequence of determined signal strengths with an optimum signal strength level.

12. The automatic level calibration method of claim 3, the optimum transmit level determining step including the step of interpolating between two received signal strength indications when the two received signal strength indications fall within a predetermined range.

13. The automatic level calibration method of claim 3, further comprising the steps of
transmitting a second addressed command to the particular terminal to transmit a single level at the optimum level and
verifying the received single level is at the optimum level.

14. The automatic level calibration method of claim 13, further comprising the step of
storing the optimum level at the particular terminal.

15. The automatic level calibration method of claim 3, the optimum transmit level determination step comprising the steps of determining an optimum transmit level for each data channel.

16. In a bi-directional cable television system comprising a system manager for controlling a plurality of television terminals over a cable television signal distribution system, a method for automatically calibrating a particular optimum transmit level for transmitting data from the television terminals to the system manager, the automatic level calibration method comprising the steps of:
transmitting an addressed command from the system manager to a particular television terminal to transmit a sequence of levels at a particular calibration frequency,
transmitting a communication including the sequence of levels from the addressed terminal if the address transmitted with the command matches an address for the terminal,
receiving the sequence of levels at the particular calibration frequency at the system manager,
determining an indication of received signal strength for each received level of the sequence of received levels,
determining an optimum transmit level for transmissions from the addressed terminal from said determined sequence of signal strengths,
maintaining a received signal strength indication for each message received from the particular terminal, and
determining a slope/tilt characteristic for data channel frequency versus signal strength indication.

17. The automatic level calibration method of claim 16 further comprising the step of:
determining an optimum transmit level for each data channel responsive to its slope/tilt characteristic.

18. In a bi-directional cable television system comprising a system manager for controlling a plurality of television terminals over a cable television signal distribution system, apparatus for automatically calibrating a particular optimum transmit level for transmitting data from the television terminals to the system manager, the automatic level calibration apparatus comprising:
programmable transmitter apparatus located at said television terminals for transmitting a communication including a sequence of levels at a particular calibration frequency in response to an addressed command generated by the system manager;
programmable receiver apparatus located at said system manager for receiving the sequence of levels at the particular calibration frequency and for determining an indication of received signal strength for each received level of the sequence of received levels;
a controller coupled to said receiver for determining an optimum transmit level for operation of the programmable transmitter apparatus at the calibration frequency from said sequence of determined signal strengths; and
wherein said sequence of levels comprises eight levels and the optimum transmit level is related to an optimum received level of approximately 12 dBmV.

19. In a bi-directional cable television system comprising a system manager for controlling a plurality of television terminals over a cable television signal distribution system, apparatus for automatically calibrating a particular optimum transmit level for transmitting data from the television terminals to the system manager, the automatic level calibration apparatus comprising:
programmable transmitter apparatus located at said television terminals for transmitting a communication including a sequence of levels at a particular calibration frequency in response to an addressed command generated by the system manager;
programmable receiver apparatus located at said system manager for receiving the sequence of levels at the particular calibration frequency and for determining an indication of received signal strength for each received level of the sequence of received levels;
a controller coupled to said receiver for determining an optimum transmit level for operation of the programmable transmitter apparatus at the calibration frequency from said sequence of determined signal strengths; and wherein the calibration frequency is selected from frequencies in the high frequency portion of the T8 frequency band.

20. In a bi-directional cable television system comprising a system manager for controlling a plurality of television terminals over a cable television signal distribution system, apparatus for automatically calibrating a particular optimum transmit level for transmitting data from the television terminals to the system manager, the automatic level calibration apparatus comprising:

programmable transmitter apparatus located at said television terminals for transmitting a communication including a sequence of levels at a particular calibration frequency in response to an addressed command generated by the system manager;

programmable receiver apparatus located at said system manager for receiving the sequence of levels at the particular calibration frequency and for determining an indication of received signal strength for each received level of the sequence of received levels, said programmable receiver apparatus comprising a plurality of data channel receivers including a channel calibration receiver, a signal strength analyzer associated with the calibration channel frequency receiver, and a received signal strength indicator associated with each of the plurality of data channel receivers including the calibration channel frequency receiver; and a controller coupled to said receiver for determining an optimum transmit level for operation of the programmable transmitter apparatus at the calibration frequency from said sequence of determined signal strengths.

* * * * *